(12) United States Patent
Itoh

(10) Patent No.: US 8,724,981 B2
(45) Date of Patent: May 13, 2014

(54) IMAGING APPARATUS, FOCUS POSITION DETECTING METHOD, AND COMPUTER PROGRAM PRODUCT

(75) Inventor: Kei Itoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 71 days.

(21) Appl. No.: 13/155,617

(22) Filed: Jun. 8, 2011

(65) Prior Publication Data

US 2011/0305446 A1 Dec. 15, 2011

(30) Foreign Application Priority Data

Jun. 15, 2010 (JP) ................................. 2010-136503

(51) Int. Cl.
*G02B 7/28* (2006.01)
*G02B 7/36* (2006.01)

(52) U.S. Cl.
CPC .... *G02B 7/36* (2013.01); *G02B 7/28* (2013.01)
USPC .......................................................... 396/95

(58) Field of Classification Search
USPC ........................................... 348/345; 396/95
See application file for complete search history.

(56) References Cited

U.S. PATENT DOCUMENTS

| 5,337,084 | A | * | 8/1994 | Nakamura | 348/345 |
| 5,404,013 | A | * | 4/1995 | Tajima | 250/332 |
| 7,433,586 | B2 | * | 10/2008 | Onozawa | 396/121 |
| 7,869,704 | B2 | * | 1/2011 | Uenishi | 396/95 |
| 7,929,042 | B2 | * | 4/2011 | Terashima | 348/345 |
| 7,945,152 | B2 | * | 5/2011 | Hirai et al. | 396/123 |
| 8,068,164 | B2 | * | 11/2011 | Kumagai et al. | 348/345 |
| 8,107,806 | B2 | * | 1/2012 | Uenishi | 396/95 |
| 8,145,049 | B2 | * | 3/2012 | Hirai et al. | 396/123 |
| 8,208,803 | B2 | * | 6/2012 | Uenishi | 396/95 |
| 8,401,228 | B2 | * | 3/2013 | Muramatsu | 382/103 |
| 2003/0169363 | A1 | * | 9/2003 | Ogino | 348/345 |

(Continued)

FOREIGN PATENT DOCUMENTS

| JP | 39-5265 | 4/1964 |
| JP | 4-158322 | 6/1992 |

(Continued)

OTHER PUBLICATIONS

Tsung-Han Tsai, A New Auto-Focus Method based on Focal Window Searching and Tracking Approach for Digital Camera, Mar. 12-14, 2008, IEEE.*

*Primary Examiner* — Clayton E Laballe
*Assistant Examiner* — Kevin Butler
(74) *Attorney, Agent, or Firm* — Oblon, Spivak, McClelland, Maier & Neustadt, L.L.P.

(57) ABSTRACT

An imaging apparatus includes: a focus lens; an imaging device; a movement detecting unit that detects the movement of an image on the basis of a difference between a plurality of image data which is output from the imaging device in time series; an estimating unit that estimates the movement of an object or a photographer on the basis of the movement of the image detected by the movement detecting unit; a movement range setting unit that sets a movement range of the focus lens on the basis of the movement of the object or the photographer estimated by the estimating unit; and a focus position detecting unit that moves the focus lens in an optical axis direction in the movement range set by the movement range setting unit and detects a focus position where the focus lens is focused on the position of the object of the image.

6 Claims, 22 Drawing Sheets

(56) References Cited

U.S. PATENT DOCUMENTS

| | | |
|---|---|---|
| 2005/0264679 A1* | 12/2005 | Sasaki et al. .................. 348/345 |
| 2006/0182433 A1* | 8/2006 | Kawahara et al. ............ 396/123 |
| 2008/0080739 A1* | 4/2008 | Muramatsu .................. 382/103 |
| 2009/0073304 A1* | 3/2009 | Kumagai et al. .............. 348/345 |
| 2009/0190909 A1* | 7/2009 | Mise et al. ...................... 396/80 |
| 2010/0226636 A1* | 9/2010 | Hirai et al. .................... 396/123 |
| 2010/0321515 A1* | 12/2010 | Imamura .................... 348/222.1 |
| 2011/0298964 A1* | 12/2011 | Hikida .......................... 348/345 |
| 2011/0305446 A1* | 12/2011 | Itoh ................................ 396/95 |

FOREIGN PATENT DOCUMENTS

| | | | | |
|---|---|---|---|---|
| JP | 1992-158322 | * | 6/1992 | ............... G02B 7/36 |
| JP | 2001-119623 | * | 4/2001 | ............. H04N 5/232 |
| JP | 2003-333411 | * | 11/2003 | ............. H04N 5/232 |
| JP | 2004-289214 | * | 10/2004 | ............. H04N 5/232 |
| JP | 2006-086952 | * | 3/2006 | ............. H04N 5/232 |
| JP | 2006-254272 | * | 9/2006 | ............. H04N 5/232 |
| JP | 2009-175442 | | 8/2009 | |
| JP | 2009-175442 | * | 11/2009 | ............. H04N 5/232 |

* cited by examiner

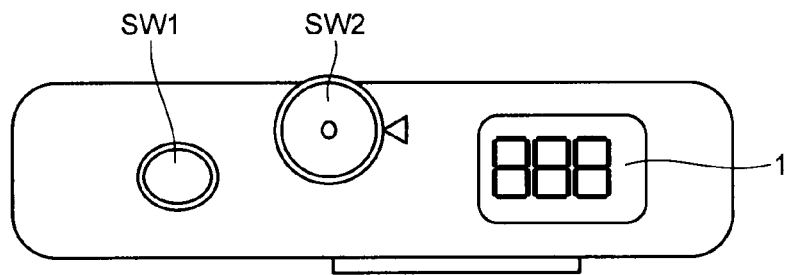
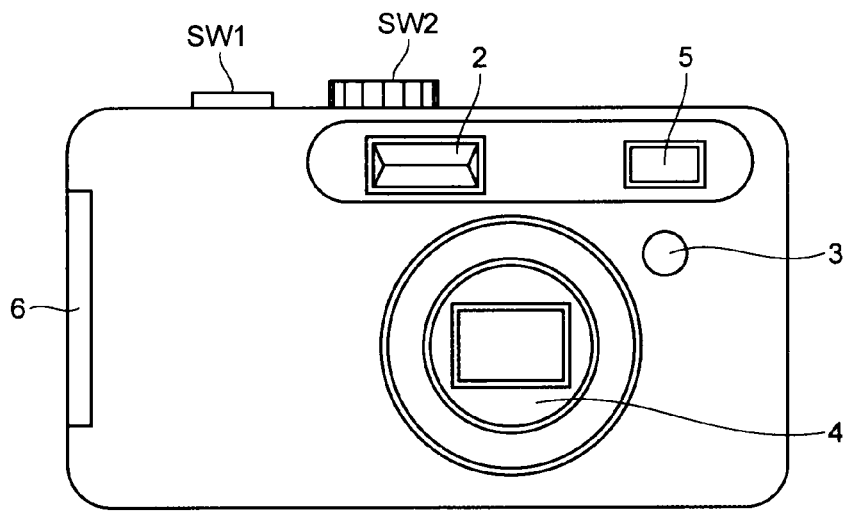
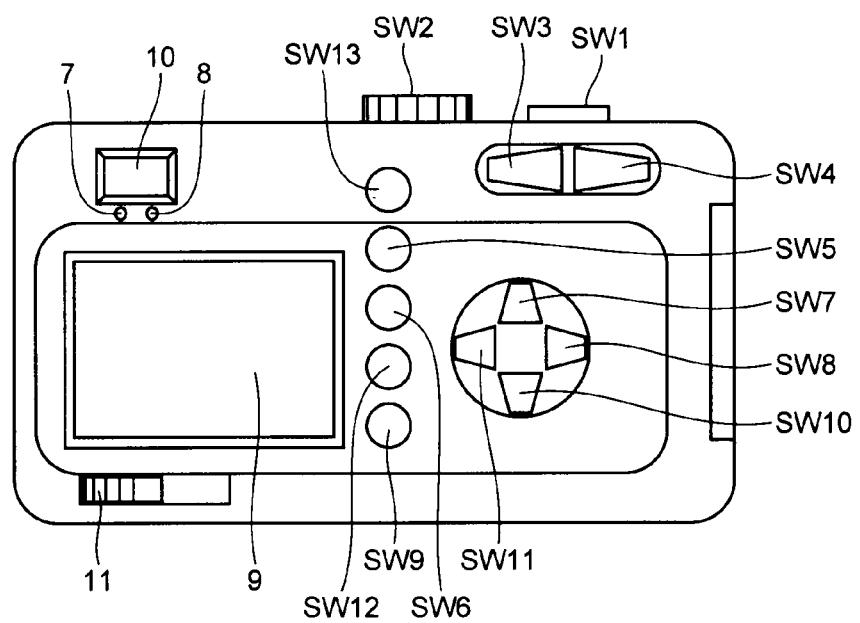

| A1 | A2 | A3 |
| --- | --- | --- |
| A4 | A5 | A6 |
| A7 | A8 | A9 |

PATTERN P1

PATTERN P2

PATTERN P3

|  | WIDE | TELE |
|---|---|---|
| ∞ | 0 | 0 |
| UP TO 2.5 m | 10 PULSES | 20 PULSES |
| UP TO 1 m | 20 PULSES | 40 PULSES |
| UP TO 30 cm | 40 PULSES | 80 PULSES |

| DETERMINATION | | POSITION OF FOCUS LENS | | |
|---|---|---|---|---|
| | Zp | UP TO 2.5 m | UP TO 1 m | UP TO 30 cm |
| FAR SIDE | WIDE | +2 PULSES | +4 PULSES | +8 PULSES |
| | TELE | +4 PULSES | +8 PULSES | +16 PULSES |
| NEAR SIDE | WIDE | +4 PULSES | +8 PULSES | +16 PULSES |
| | TELE | +8 PULSES | +16 PULSES | +32 PULSES |

PATTERN P4

PATTERN P4

PATTERN P4

PATTERN P5

PATTERN P5

PATTERN P5

PATTERN P6

PATTERN P6

PATTERN P7

PATTERN P8

IMAGING APPARATUS, FOCUS POSITION DETECTING METHOD, AND COMPUTER PROGRAM PRODUCT

CROSS-REFERENCE TO RELATED APPLICATIONS

The present application claims priority to and incorporates by reference the entire contents of Japanese Patent Application No. 2010-136503 filed in Japan on Jun. 15, 2010.

BACKGROUND OF THE INVENTION

1. Field of the Invention

The present invention relates to an imaging apparatus, a focus position detecting method, and a computer program product.

2. Description of the Related Art

In general, imaging apparatuses, such as digital still cameras, have an autofocus (hereinafter, referred to as "AF") function of automatically bringing an object into focus. As a method of controlling an AF operation, hill-climbing AF control has been widely known (for example, see Japanese Patent Application Publication (Kokoku) No. 39-005265). In the hill-climbing AF control, the integrated value of the brightness difference between neighboring pixels is calculated from image data output from an imaging device and the integrated value of the brightness difference is used as an AF evaluation value indicating the degree of focus. When the object is in focus, the contour of the object is clear and the brightness difference between neighboring pixels increases, which results in an increase in the AF evaluation value. On the other hand, when the object is out of focus, the contour of the object is unclear and the brightness difference between neighboring pixels decreases, which results in a reduction in the AF evaluation value. During the AF operation, the focus lens is moved in the optical axis direction and the AF evaluation value is sequentially acquired. A position where the AF evaluation value is the maximum, that is, a peak position is used as a focus position and the focus lens stops at the focus position.

In recent years, as a technique of the digital still camera, an object tracking function for tracking a main object in the image has been put into practical use. The object tracking function detects the amount of movement and moving direction of the object using, for example, template matching in which the image data of an object image, which is a tracking target, is used as a template, moves an area (hereinafter, referred to as an "AF area") to be subjected to the AF operation so as to track a moving object with the movement of the object, and performs the AF operation or calculates exposure conditions (for example, see Japanese Patent Application Laid-open No. 2009-175442 and Japanese Patent Application Laid-open No. H4-158322).

The imaging apparatus with the object tracking function according to the related art can move the AF area to follow the movement of the object. However, in the imaging apparatus, for example, when the object moves in the depth direction (a direction close to the photographer or a direction away from the photographer) of the image, the focus position is likely to be lost during the AF operation. That is, when the AF operation is performed using the position of the object, which is a tracking target, as an AF area, the movement range of the focus lens for acquiring an AF evaluation value is limited in order to perform the AF operation at a high speed considering the movement of the object. In this case, when the object moves in the depth direction of the image, the focus position of the object is disposed beyond the movement range of the focus lens. As a result, the focus position is likely to be lost.

SUMMARY OF THE INVENTION

It is an object of the present invention to at least partially solve the problems in the conventional technology.

According to an aspect of the present invention, there is provided an imaging apparatus including: a focus lens; an imaging device that receives light incident through the focus lens and outputs image data; a movement detecting unit that detects the movement of an image on the basis of a difference between a plurality of image data which is output from the imaging device in time series; an estimating unit that estimates the movement of an object or a photographer on the basis of the movement of the image detected by the movement detecting unit; a movement range setting unit that sets a movement range of the focus lens on the basis of the movement of the object or the photographer estimated by the estimating unit; and a focus position detecting unit that moves the focus lens in an optical axis direction in the movement range set by the movement range setting unit and detects a focus position where the focus lens is focused on the position of the object of the image.

According to another aspect of the present invention, there is provided a method of detecting a focus position performed by an imaging apparatus includes a focus lens, an imaging device that receives light incident through the focus lens and outputs image data, a movement detecting unit, an estimating unit, a movement range setting unit, and a focus position detecting unit, the method including: detecting, by the movement detecting unit, the movement of an image on the basis of a difference between a plurality of image data which is output from the imaging device in time series; estimating, by the estimating unit, the movement of an object or a photographer on the basis of the detected movement of the image; setting, by the movement range setting unit, a movement range of the focus lens on the basis of the estimated movement of the object or the photographer; and moving, by the movement range setting unit, the focus lens in an optical axis direction in the set movement range and detecting, by the movement range setting unit, a focus position where the focus lens is focused on the position of the object of the image.

According to still another aspect of the present invention, there is provided A computer program product including a non-transitory computer-readable medium having computer-readable program codes for detecting a focus position performed by an imaging apparatus includes a focus lens, an imaging device that receives light incident through the focus lens and outputs image data, a movement detecting unit, an estimating unit, a movement range setting unit, and a focus position detecting unit, the program codes when executed causing the imaging apparatus to execute: detecting, by the movement detecting unit, the movement of an image on the basis of a difference between a plurality of image data which is output from the imaging device in time series; estimating, by the estimating unit, the movement of an object or a photographer on the basis of the detected movement of the image; setting, by the movement range setting unit, a movement range of the focus lens on the basis of the estimated movement of the object or the photographer; and moving, by the movement range setting unit, the focus lens in an optical axis direction in the set movement range and detecting, by the movement range setting unit, a focus position where the focus lens is focused on the position of the object of the image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1A is a top view illustrating a digital still camera;

FIG. 1B is a front view illustrating the digital still camera;

FIG. 1C is a rear view illustrating the digital still camera;

DETAILED DESCRIPTION OF THE PREFERRED EMBODIMENTS

Figure 2:
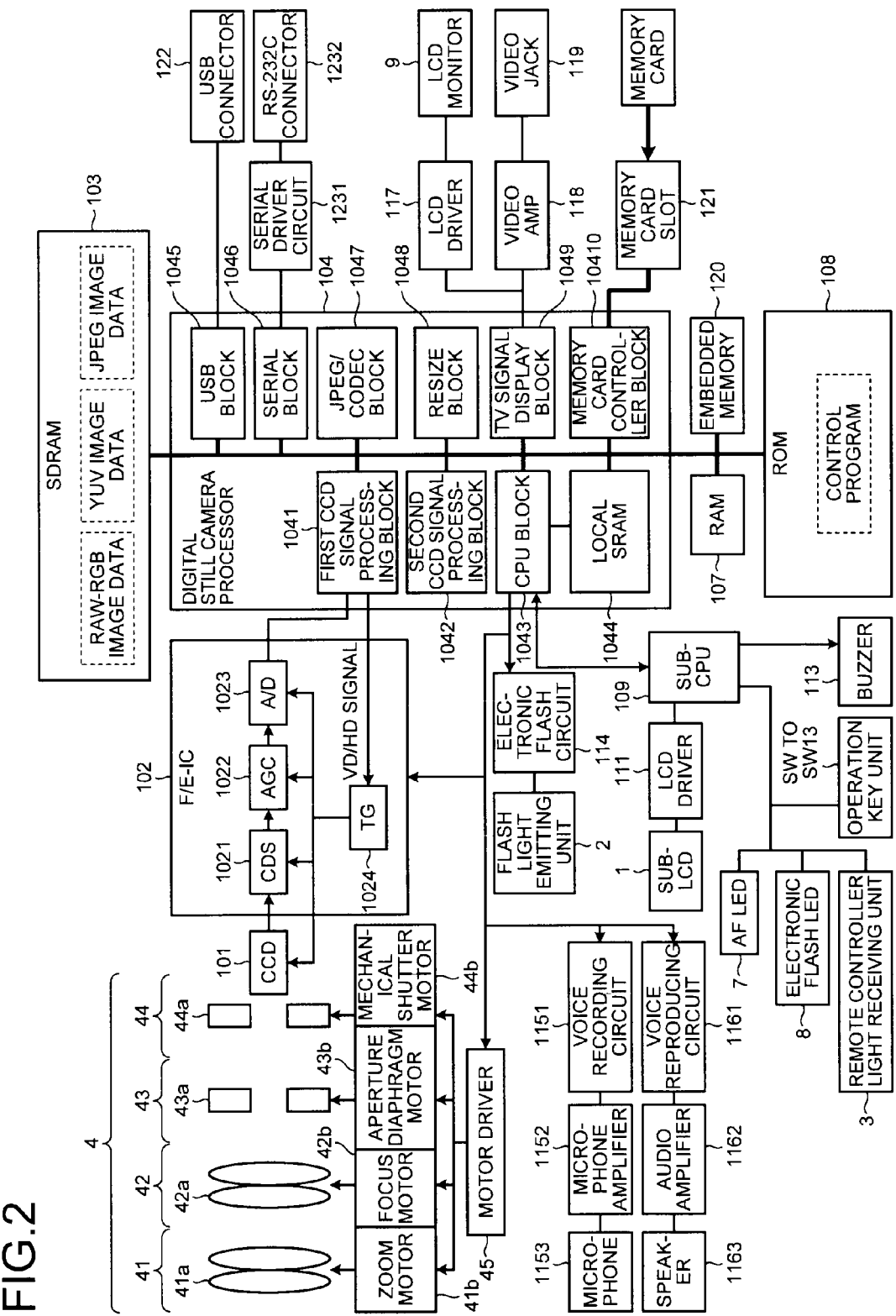
FIG. 2 is a block diagram illustrating the structure of a control system of the digital still camera.

Hereinafter, an imaging apparatus, a focus position detecting method, and a computer program product according to exemplary embodiments of the invention will be described in detail with reference to the accompanying drawings. In the following description, the invention is applied to a digital still camera. However, the invention can be widely applied to all types of imaging apparatuses having a function of performing an AF operation while tracking an object.

Structure of Digital Still Camera

FIGS. 1A to 1C are diagrams illustrating the outward appearance of a digital still camera according to this embodiment. FIG. 1A is a top view illustrating the digital still camera, FIG. 1B is a front view illustrating the digital still camera, and FIG. 1C is a rear view illustrating the digital still camera.

As shown in FIG. 1A, the digital still camera according to this embodiment includes on the upper surface thereon a sub-liquid crystal display (hereinafter, referred to as a liquid crystal display "LCD") 1 that displays, for example, the number of still images that can be captured, a release shutter SW1 that is pressed to capture still images, and a mode dial SW2 that is operated to switch various kinds of modes, such as a recording (imaging) mode that records images, a reproduction mode that reproduces the recorded images, and a SETUP mode for setting the camera.

As shown in FIG. 1B, the digital still camera according to this embodiment includes on the front surface thereof a flash light emitting unit 2 that emits flash light, a remote controller light receiving unit 3 that receives an infrared signal from a remote controller terminal (not shown), a lens barrel unit 4, and an optical finder (front surface) 5. A memory card slot into which a memory card, which will be described below, is inserted and a battery storage portion that stores a battery are provided in the side surface of the digital still camera according to this embodiment. The memory card slot and the battery storage portion are blocked by a cover 6.

As shown in FIG. 1C, the digital still camera according to this embodiment includes on the rear surface thereof an AF LED 7 that is turned on during an AF operation, an electronic flash LED 8 that is turned on when flash light is emitted, an LCD monitor 9 that is used as an electronic finder when various kinds of setting screens or reproduced images are displayed and images are captured, an optical finder (rear surface) 10, and a power switch 11.

Various kinds of switches are provided on the rear surface of the digital still camera according to this embodiment. For example, the following switches are provided: a zoom (WIDE) switch SW3 that is operated during zooming to the wide-angle side, a zoom (TELE) switch SW4 that is operated during zooming to the telephoto side, a self-timer/delete switch SW5 that is used to operate a self-timer, a menu switch SW6 that is operated to select the menu, an up/electronic flash switch SW7 that is operated to switch the flash mode (for example, auto, flash on, and red-eye reduction) and is operated to move a cursor on the LCD monitor 9 in the upward direction, a right switch SW8 that is operated to move the cursor on the LCD monitor 9 to the right, a display switch SW9 that is operated to switch the display of the LCD monitor 9, a down/macro switch SW10 that is operated to perform macro photography and is operated to move the cursor on the LCD monitor 9 in the downward direction, a left/image confirmation switch SW11 that is operated to confirm the captured image on the LCD monitor 9 and is operated to move the cursor on the LCD monitor 9 to the left, an OK switch SW12 that settles a selected item, and a quick access switch SW13 that is operated to select a registered menu.

FIG. 2 is a block diagram illustrating the structure of a control system of the digital still camera according to this embodiment. The digital still camera according to this embodiment includes a CCD 101 that converts light incident through the lens barrel unit 4 into an electric signal and outputs the electric signal, an F/E (front end)-IC 102 that pre-processes the analog electric signal input from the CCD 101 and outputs a digital signal, and a digital still camera processor (hereinafter, simply referred to as a "processor") 104 that processes the digital signal from the F/E-IC 102 and controls various kinds of operations of the digital still camera.

The lens barrel unit 4 includes a zoom optical system 41 which includes a zoom lens 41a for capturing the optical image of an object and a zoom motor 41b, a focus optical system 42 including a focus lens 42a and a focus motor 42b, an aperture diaphragm unit 43 including an aperture diaphragm 43a and an aperture diaphragm motor 43b, a mechanical shutter unit 44 including a mechanical shutter 44a and a mechanical shutter motor 44b, and a motor driver 45 that drives each motor. The driving of the motor driver 45 is controlled by a driving command from a CPU block 1043, which will be described below, in the processor 104.

The CCD 101 is a solid-state imaging device that receives light incident through the lens barrel unit 4, converts the optical image into an electric signal, and outputs image data corresponding to the optical image. In the digital still camera according to this embodiment, the CCD 101 is used as an imaging device. However, instead of the CCD 101, other imaging devices, such as CMOS image sensors, may be used.

The F/E-IC 102 includes a CDS 1021 that performs correlated double sampling for removing image noise, an AGC 1022 that adjusts the gain, an A/D converter 1023 that converts an analog signal into a digital signal, and a TG (Timing Generator) 1024 that generates driving timing signals for the CCD 101, the CDS 1021, the AGC 1022, and the A/D converter 1023 on the basis of a vertical synchronization signal (VD signal) and a horizontal synchronization signal (HD signal) supplied from a first CCD signal processing block 1041, which will be described below, in the processor 104. The CPU block 1043, which will be described below, in the processor 104 controls the operation of each unit in the F/E-IC 102.

The processor 104 includes the first CCD signal processing block 1041, a second CCD signal processing block 1042, the CPU block 1043, a local SRAM 1044, a USB block 1045, a serial block 1046, a JPEG/CODEC block 1047, a RESIZE block 1048, a TV signal display block 1049, and a memory card controller block 10410. The above-mentioned units in the processor 104 are connected to one another by a bus.

The first CCD signal processing block 1041 performs white balance correction or gamma correction on the image data input from the CCD 101 through the F/E-IC 102 and supplies the VD signal and the HD signal for controlling the timing of the image data to the TG 1024. The second CCD signal processing block 1042 converts the input image data into brightness data/color difference data using a filtering process.

The CPU block 1043 controls the operation of each unit of the digital still camera according to this embodiment. Specifically, the CPU block 1043 controls a voice recording operation of a voice recording circuit 1151. The voice recording circuit 1151 records a voice signal that has been converted by a microphone 1153 and then amplified by a microphone amplifier 1152 in response to a command from the CPU block 1043. The CPU block 1043 also controls a voice reproducing operation of a voice reproducing circuit 1161. The voice reproducing circuit 1161 reproduces the voice signal stored in an appropriate memory in response to a command from the CPU block 1043, inputs the voice signal to an audio amplifier 1162, and outputs a voice from a speaker 1163. In addition, the CPU block 1043 controls the operation of an electronic flash circuit 114 to emit illumination light from the flash light emitting unit 2. Further, the CPU block 1043 performs a process of detecting a focus position according to the position of the object as a characteristic process of this embodiment, which will be described in detail below.

The CPU block 1043 is connected to a sub-CPU 109 that is provided outside the processor 104. The sub-CPU 109 controls the display of images on the sub-LCD 1 by an LCD driver 111. The sub-CPU 109 is connected to the AF LED 7, the electronic flash LED 8, the remote controller light receiving unit 3, a buzzer 113, and an operation key unit including the switches SW1 to SW13. The sub-CPU 109 controls the operations of the AF LED 7, the electronic flash LED 8, and the buzzer 113 on the basis of user operation information, which is an output signal from the operation key unit or the remote controller light receiving unit 3, and transmits the user operation information to the CPU block 1043 in the processor 104.

The local SRAM 1044 is a memory that temporarily stores, for example, data required for control. The USB block 1045 performs USB communication with an external apparatus, such as a computer terminal connected to a USB connector 122. The serial block 1046 performs serial communication with an external apparatus, such as a computer terminal connected to an RS-232C connector 1232, through a serial driver circuit 1231.

The JPEG/CODEC block 1047 compresses captured image data in a JPEG format and expands the data of the recording image compressed in the JPEG format. The RESIZE block 1048 increases or decreases the size of the image data using an interpolation process.

The TV signal display block 1049 converts the image data into a video signal for displaying the image data on an external display apparatus, such as the LCD monitor 9 or a TV. An LCD driver 117 is connected to the TV signal display block 1049. The TV signal display block 1049 displays an image on the LCD monitor 9 driven by the LCD driver 117. In addition, a video AMP 118 is connected to the TV signal display block 1049. When a video jack 119 is connected to an external display apparatus, such as a TV, the TV signal display block 1049 displays an image on the external display apparatus.

The memory card controller block 10410 is connected to a memory card slot 121 and controls, for example, a memory card or a general-purpose PCMCIA inserted into the memory card slot 121.

An SDRAM 103, a RAM 107, a ROM 108, and an embedded memory 120 are provided outside the processor 104 and are connected to the processor 104 by a bus.

The SDRAM 103 is a memory that temporarily stores image data when the processor 104 performs image processing. The stored image data is input to the processor 104 from, for example, the CCD 101 to the F/E-IC 102. Examples of the image data include "RAW-RGB image data" subjected to white balance correction or gamma correction by the first CCD signal processing block 1041, "YUV image data" subjected to brightness data/color difference data conversion by the second CCD signal processing block 1042, and "JPEG image data" compressed in the JPEG format by the JPEG/CODEC block 1047.

The ROM 108 stores control programs that are described with codes which can be read by the CPU block 1043 or parameters for control. The parameters may be stored in the embedded memory 120. When the power of the digital still camera is turned on, a program is loaded to a main memory (not shown) and the CPU block 1043 controls the operation of each unit according to the program and temporarily stores, for example, data required for control in the RAM 107 and the local SRAM 1044 of the processor 104. When a rewritable flash ROM is used as the ROM 108, it is possible to change the control program or the parameters for control and easily upgrade the version of the function.

The embedded memory 120 is for storing captured image data when no memory card is inserted into the memory card slot 121. The RAM 107 is used as a work area when the CPU block 1043 executes the control program.

Outline of Operation of Digital Still Camera

Next, the outline of the operation of the digital still camera having the above-mentioned structure will be described. The operation modes of the digital still camera according to this embodiment include a recording mode that captures an image and records the captured image and a reproduction mode that reproduces the recorded image. The recording mode includes a tracking AF mode that performs an AF operation at the position of the object while tracking the object and a normal AF mode that performs an AF process in a predetermined AF area at the center of the image. The operation modes are switched by the mode dial SW2. In an imaging standby state (before the release shutter SW1 is pressed) in the recording mode, an image for monitoring is displayed on the LCD monitor 9. The imaging standby state in the recording mode is particularly referred to as a finder mode.

When the power switch 11 is pressed with the mode dial SW2 in the recording mode, the digital still camera starts in the recording mode. When the digital still camera starts in the recording mode, the CPU block 1043 of the processor 104 controls the motor driver 45 to move the lens barrel unit 4 to a position where an image can be captured. In addition, the CPU block 1043 supplies power to each unit, such as the CCD 101, the F/E-IC 102, and the LCD monitor 9, to start the operation thereof. When power is supplied to each unit, an operation starts in the finder mode.

In the finder mode, the CCD 101 receives light incident on the CCD 101 through the lens barrel unit 4, converts the optical image into analog RGB signals, and inputs the converted analog RGB signals to the F/E-IC 102. The CDS 1021 and the AGC 1022 of the F/E-IC 102 perform a predetermined process, such as a process of reducing noise or a process of adjusting the gain, on the analog RGB signals, and the A/D converter 1023 converts the analog RGB signals into digital signals. The digital signals are input to the first CCD signal processing block 1041 of the processor 104.

The digital RGB signals input to the first CCD signal processing block 1041 are transmitted to the second CCD signal processing block 1042. The second CCD signal processing block 1042 converts the digital RGB signals into YUV image data (brightness data/color difference data). Then, the YUV image data is written to a frame memory of the SDRAM 103. The YUV image data is frequently read from the frame memory and is then transmitted to the TV signal display block 1049. The TV signal display block 1049 converts the YUV image data into video signals. The video signals are supplied to an external display apparatus, such as the LCD monitor 9 or a TV, and an image is displayed. In the finder mode, the above-mentioned process is performed at an interval of 1/30 second and the image (hereinafter, referred to as a "finder image") displayed on, for example, the LCD monitor 9 is updated at an interval of 1/30 second.

When the release shutter SW1 is pressed, the CPU block 1043 calculates an AF evaluation value indicating the degree of focus of the image input in the processor 104 and an AE evaluation value indicating the exposure state. The AF evaluation value is the integrated value of the brightness difference between neighboring pixels in the AF area. When the integrated value indicates that the AF area is in focus, the edge of the image in the AF area is clear and a high-frequency component is the largest. Therefore, during the AF operation, the AF evaluation value at each position of the focus lens 42a is acquired while the focus lens 42a is moved in the optical axis direction and a point (peak position) where the AF evaluation value is the maximum is detected. It is also considered that there is a plurality of points where the AF evaluation value is the maximum. When there is a plurality of points where the AF evaluation value is the maximum, the difference between the AF evaluation value at the peak position and the AF evaluation value in the vicinity of the peak position is determined, and a point where reliability is the highest is used as the focus position. The focus lens 42a is moved to the focus position and then a recording image is captured.

Figure 3A:
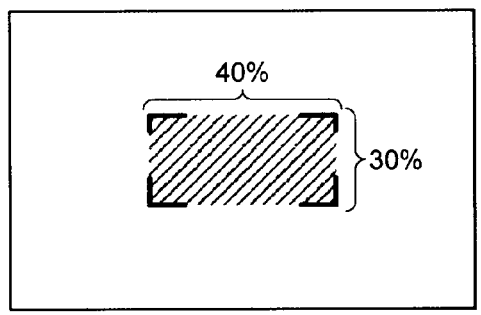
FIGS. 3A and 3B are diagrams illustrating an example of an AF area.
Figure 3B:
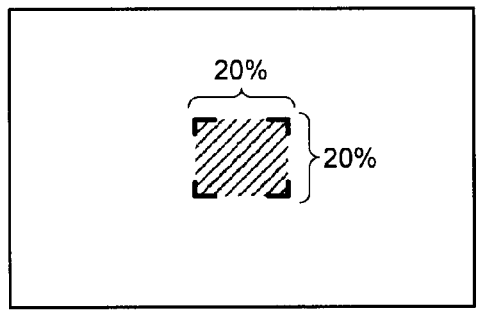

The AF area from which the AF evaluation value will be calculated during the AF operation varies depending on the kind of AF operation mode. When the AF operation mode is the normal AF mode, a predetermined range at the center of the image, for example, a range (a hatched area in FIG. 3A) that is 40% of the size of the entire image in the horizontal direction and is 30% of the size in the vertical direction is used as the AF area, as shown in FIG. 3A. When the AF operation mode is the tracking AF mode, for example, a range (a hatched area in FIG. 3B) that is 20% of the size of the entire image in the horizontal direction and is 20% of the size in the vertical direction is used as the AF area, as shown in FIG. 3B, and the AF area is moved in the screen to follow the movement of the object. In the normal AF mode, the movement range (hereinafter, referred to as a "focus position detection range") of the focus lens 42a during the AF operation is the entire movable range (from a near position to an infinite position) of the focus lens 42a. In the tracking AF mode, since a high-speed AF operation is required, the focus position detection range is limited to a range corresponding to the current position and focal length (on the wide-angle side or the telephoto side) of the focus lens 42a.

However, during the AF operation in the tracking AF mode, when the object moves in the depth direction of the image, the focus position in the AF area that is set at the position of the object is beyond the focus position detection range and there is a concern that the focus position is lost since the focus position detection range is limited as described above. In contrast, in the digital still camera according to this embodiment, the CPU block 1043 of the processor 104 can analyze the image data (digital RGB signals) input from the CCD 101 through the F/E-IC 102, estimate the movement of the object or the photographer, set the focus position detection range during the AF operation in the tracking AF mode on the basis of the estimation result, and appropriately detect the focus position of the object.

Figure 4:
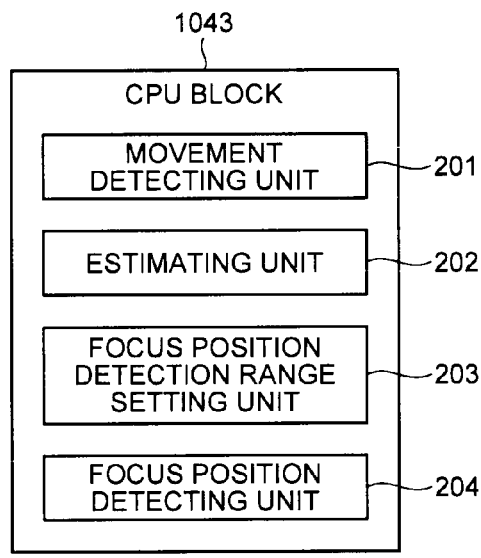
FIG. 4 is a functional block diagram illustrating a CPU block in a digital still camera processor.

FIG. 4 is a functional block diagram illustrating the CPU block 1043 for implementing the above-mentioned functions. The CPU block 1043 executes a focus position detecting program which is stored as one of the control programs in the ROM 108 and is loaded to the main memory to implement the functions of a movement detecting unit 201, an estimating unit 202, a focus position detection range setting unit 203, and a focus position detecting unit 204, as shown in FIG. 4.

The movement detecting unit 201 has a function of detecting the movement (motion vector) of the image on the basis of the difference between a plurality of image data items which is output from the CCD 101 in time series and is then input from the F/E-IC 102 to the processor 104.

The estimating unit 202 has a function of estimating the movement of the object or the photographer on the basis of the movement of the image detected by the movement detecting unit 201.

The focus position detection range setting unit 203 has a function of setting a focus position detection range, which is the movement range of the focus lens 42a during the AF operation, on the basis of the movement of the object or the photographer estimated by the estimating unit 202.

The focus position detecting unit 204 has a function of moving the focus lens 42a in the optical axis direction in the focus position detection range set by the focus position detection range setting unit 203, calculating the AF evaluation value at each of the moved positions of the focus lens 42a, and detecting the position of the focus lens 42a where the AF evaluation value is the maximum as the focus position of the object.

Next, an example (embodiment) of the operation of the digital still camera implemented by the CPU block 1043 having the functions of the movement detecting unit 201, the estimating unit 202, the focus position detection range setting unit 203, and the focus position detecting unit 204 will be described in detail.

First Embodiment

Figure 5:
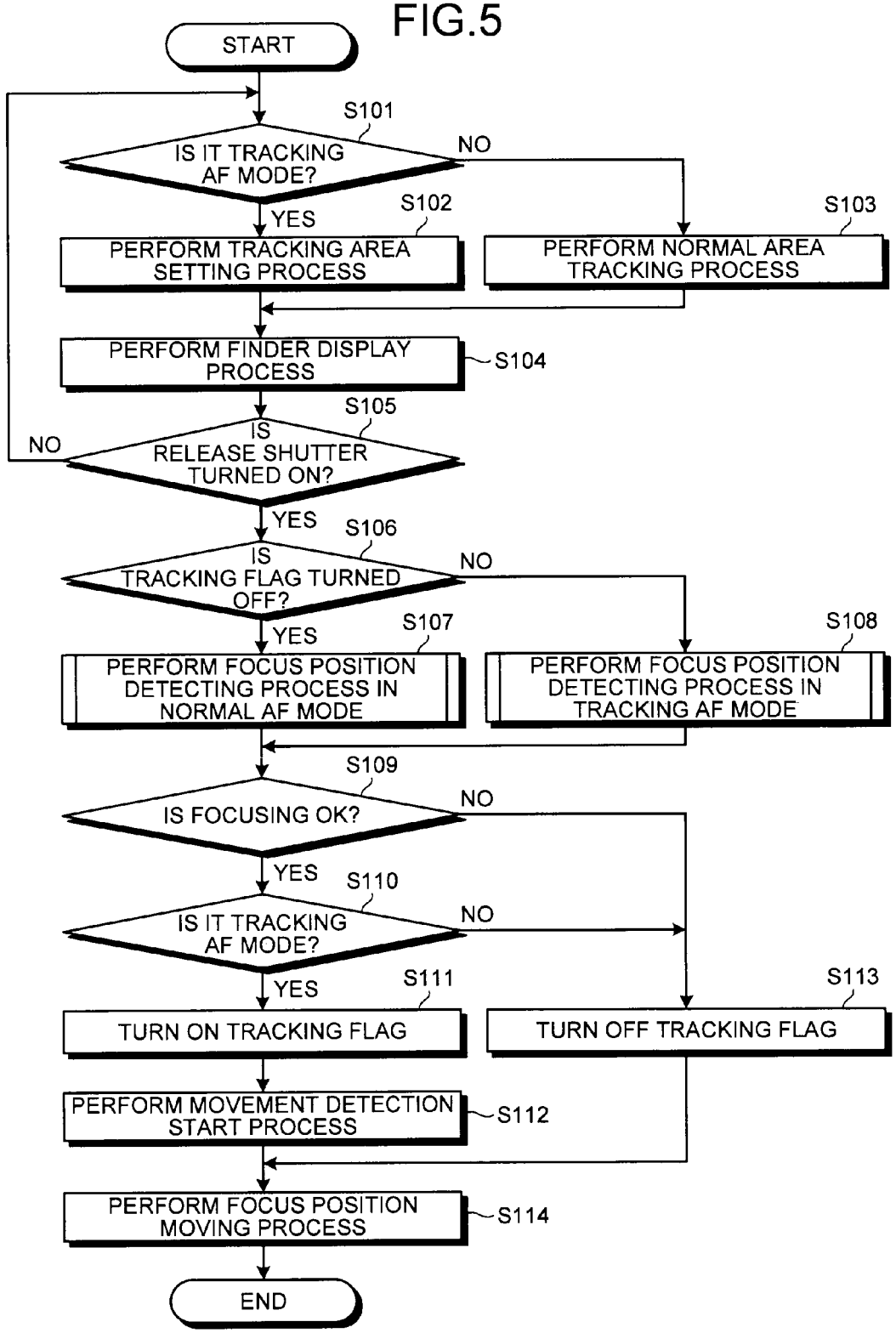
FIG. 5 is a main flowchart illustrating the overall flow of an AF operation performed in the digital still camera.

FIG. 5 is a main flowchart illustrating the overall flow of the AF operation performed by the digital still camera according to this embodiment. The flowchart shown in FIG. 5 starts when the digital still camera starts in the recording mode.

When the flowchart shown in FIG. 5 starts, first, the CPU block 1043 checks the state of the mode dial SW2 and determines whether the AF operation mode is the tracking AF mode or the normal AF mode (Step S101). When it is determined that the AF operation mode is the tracking AF mode (Step S101: YES), the CPU block 1043 performs a process of setting an AF area for the tracking AF mode (Step S102). When it is determined that the AF operation mode is the normal AF mode (Step S101: NO), the CPU block 1043 performs a process of setting an AF area for the normal AF mode (Step S103). Then, the CPU block 1043 displays a mark (see FIG. 3B) indicating the AF area set in Step S102 or a mark (see FIG. 3A) indicating the AF area set in Step S103 on, for example, the LCD monitor 9 so as to be superimposed on a finder image (Step S104).

Then, the CPU block 1043 monitors the operation of the release shutter SW1 (Step S105). When the release shutter SW1 is not pressed (Step S105: NO), the CPU block 1043 repeatedly performs the above-mentioned process. When the release shutter SW1 is pressed (Step S105: YES), the CPU block 1043 moves the process to the next Step S106.

Figure 6:
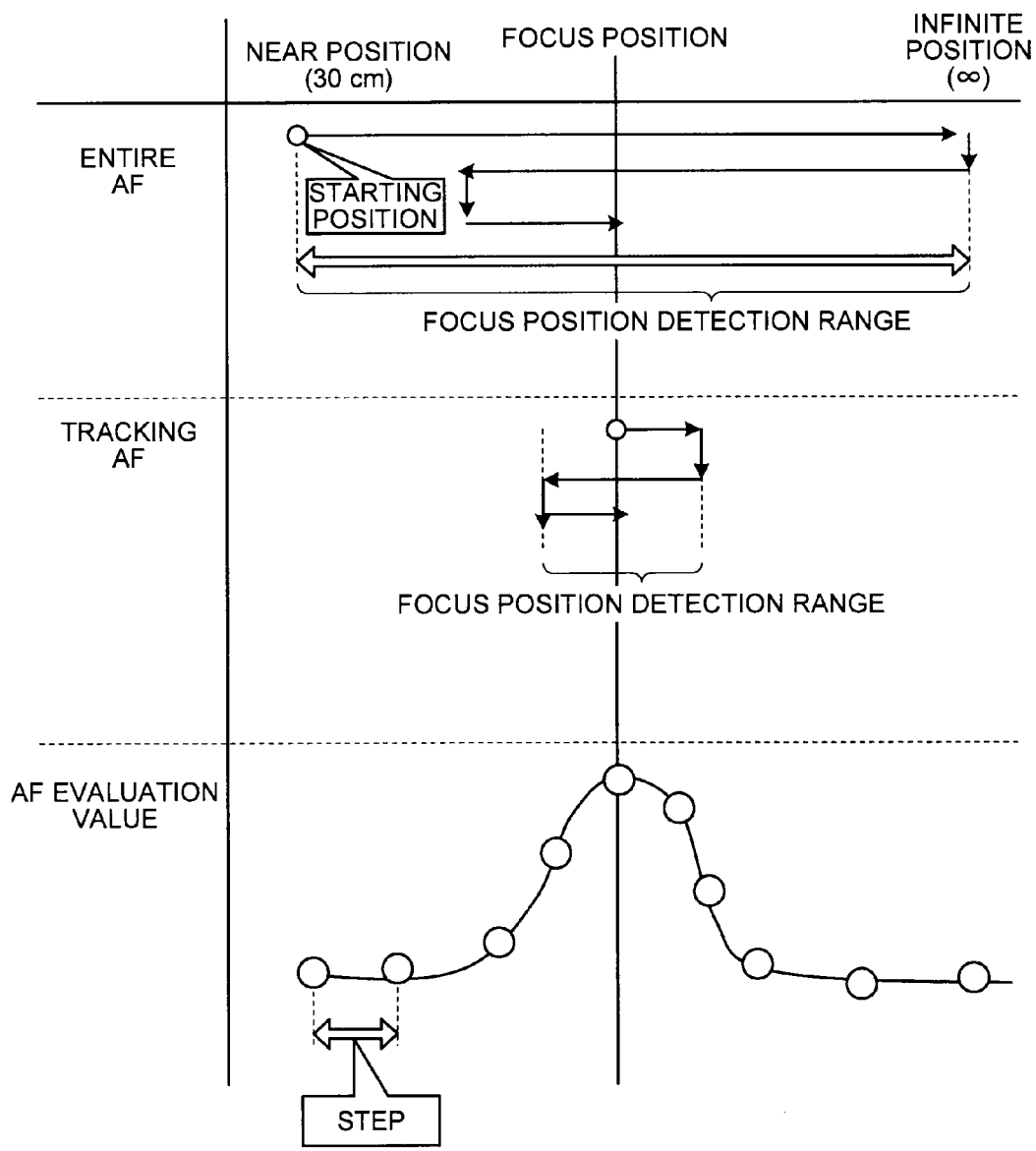
FIG. 6 is a diagram illustrating an example of a method of driving a focus lens in a focus position detecting process and an AF evaluation value acquired in the normal AF mode.

In Step S106, the CPU block 1043 determines whether a tracking flag is turned off. This is for checking whether an object tracking operation is performed when the release shutter SW1 is pressed. When the tracking flag is turned off (Step S106: YES), the CPU block 1043 performs the focus position detecting process in the normal AF mode (Step S107). When the tracking flag is turned on (Step S106: NO), the CPU block 1043 performs the focus position detecting process in the tracking AF mode (Step S108). The focus position detecting process means a process of acquiring the AF evaluation value of the AF area set in Step S102 or Step S103 at each moved position of the focus lens 42a while moving the focus lens 42a step by step in the focus position detection range, detecting the peak, and searching for the focus position. In the normal AF mode, as described above, the focus position detection range in which the focus lens 42a is moved is the entire movable range (from a near position to an infinite position) of the focus lens 42a. In the tracking AF mode, the focus position detection range is limited to the peripheral range of the focus position (current position). FIG. 6 shows an example of a method of driving the focus lens 42a in the focus position detecting process and the AF evaluation value acquired in the normal AF mode. In the example shown in FIG. 6, the movement starting position of the focus lens 42a in the normal AF mode is a near position and the digital still camera is 30 cm away from the near position.

Figure 7:
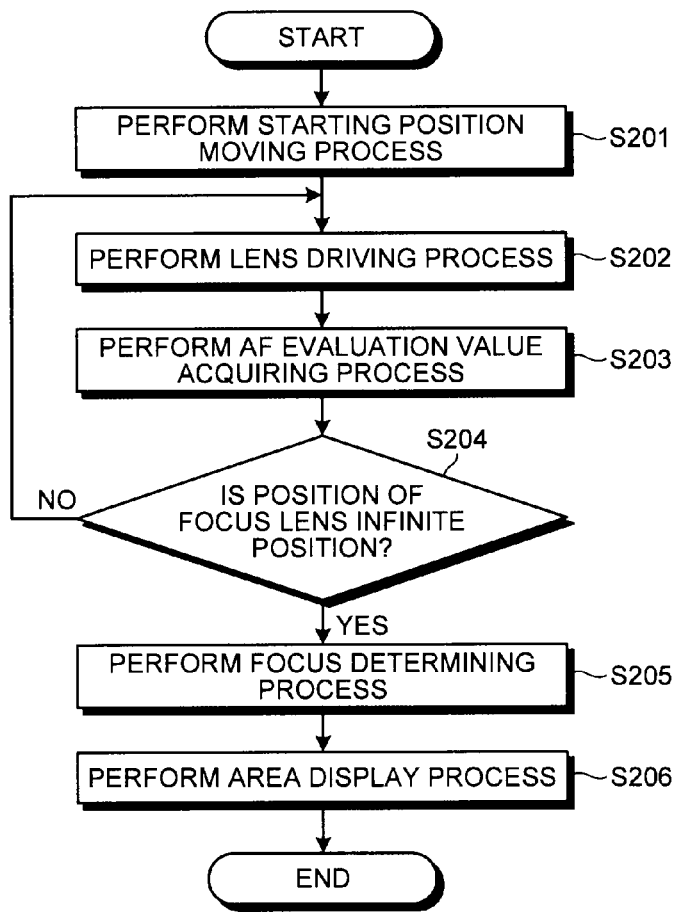
FIG. 7 is a flowchart illustrating the details of the focus position detecting process in the normal AF mode.

FIG. 7 is a flowchart illustrating the details of the focus position detecting process in the normal AF mode in Step S107 of FIG. 5. In the focus position detecting process in the normal AF mode, first, the CPU block 1043 performs a starting position moving process (Step S201) to move the position of the focus lens 42a to the movement starting position. It is assumed that the movement starting position is the near position. In some cases, the near position varies depending on optical systems. However, in general, it is preferable that the near position be about 30 cm.

Then, the CPU block 1043 performs a lens driving process (Step S202) to move the focus lens 42a step by step to the infinite position. Then, the CPU block 1043 performs an AF evaluation value acquiring process (Step S203) to acquire the AF evaluation value of the AF area at each moved position. In this embodiment, a pulse motor is used as the focus motor 42b and a movement distance corresponding to one step of the focus lens 42a is converted into the number of driving pulses of the focus motor 42b. Specifically, when the focal length is on the wide-angle side, the focus motor 42b is sequentially driven by one pulse. When the focal length is on the telephoto side, the focus motor 42b is sequentially driven by two pulses. In this way, the focus lens 42a is moved to the infinite position. The CPU block 1043 repeatedly performs the lens driving process of Step S202 and the AF evaluation value acquiring process of Step S203 until the focus lens 42a reaches the infinite position (Step S204: NO). When the focus lens 42a reaches the infinite position (Step S204: YES), the CPU block 1043 moves the process to the next Step S205.

In Step S205, the CPU block 1043 performs a focus position determining process. The focus position determining process determines whether the focus position can be detected on the basis of the AF evaluation value acquired at each moved position of the focus lens 42a. Specifically, the above-mentioned reliability evaluation is performed on the acquired AF evaluation value and the peak position in the AF evaluation value is determined. When a reliable peak position is detected, the position of the focus lens 42a is stored as the focus position in, for example, the local SRAM 1044 and it is determined that focusing is OK. On the other hand, when the reliable peak position is not detected, it is determined that focusing is NG.

Figure 8A:
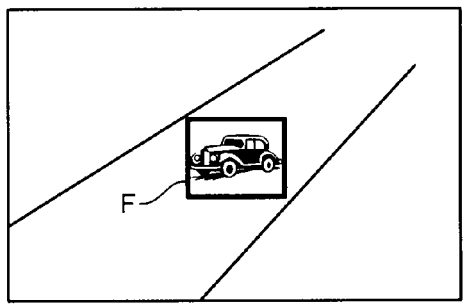
FIGS. 8A and 8B are diagrams illustrating an area display process.
Figure 8B:
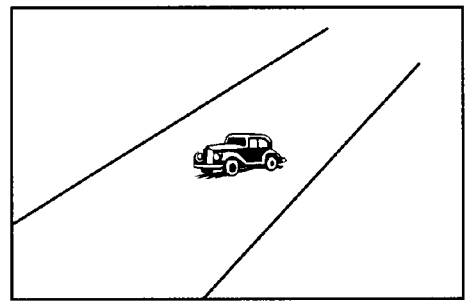

Finally, the CPU block 1043 performs an area display process (Step S206) and ends the focus position detecting process in the normal AF mode. The area display process displays a focus frame F indicating the focus position on, for example, the LCD monitor 9 so as to be superimposed on the finder image, as shown in FIG. 8A, when it is determined that focusing is OK in the focus determining process of Step S205, and displays the focus frame F on, for example, the LCD monitor 9 so as not to be superimposed on the finder image, as shown in FIG. 8B, when it is determined that focusing is NG in the focus determining process of Step S205.

Figure 9:
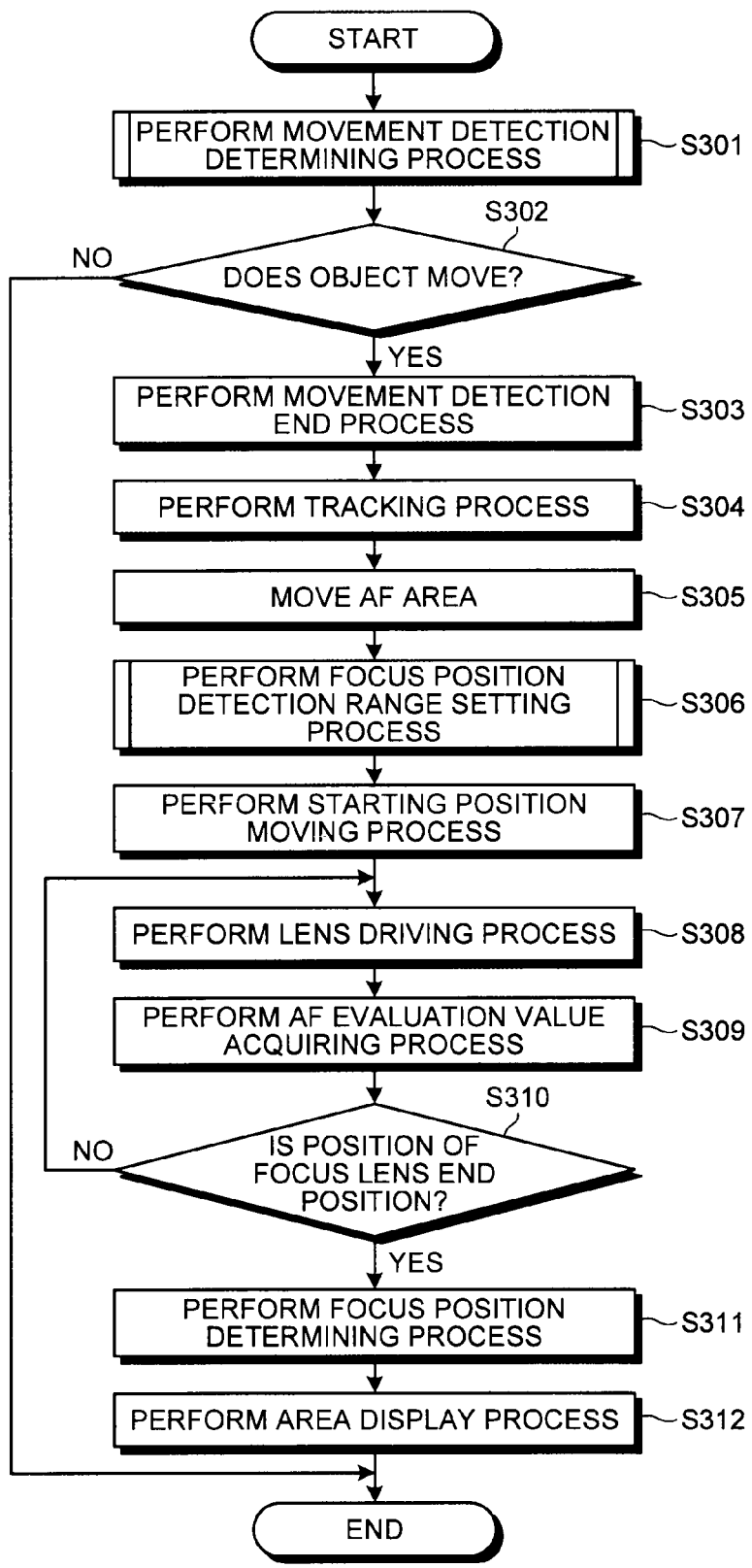
FIG. 9 is a flowchart illustrating the details of the focus position detecting process in the tracking AF mode.

FIG. 9 is a flowchart illustrating the details of the focus position detecting process in the tracking AF mode in Step S108 of FIG. 5. In the focus position detecting process in the tracking AF mode, first, the CPU block 1043 performs a movement detection determining process (Step S301). That is, in the tracking AF mode, since the movement detecting unit 201 performs a process of detecting the movement of the image, the pattern of the movement of the image detected by the movement detecting process of the movement detecting unit 201 is determined. The movement of the image can be detected by any of various kinds of known techniques. In this embodiment, it is assumed that the movement of the image is detected by the following template matching.

Figures 10, 11A, 11B:
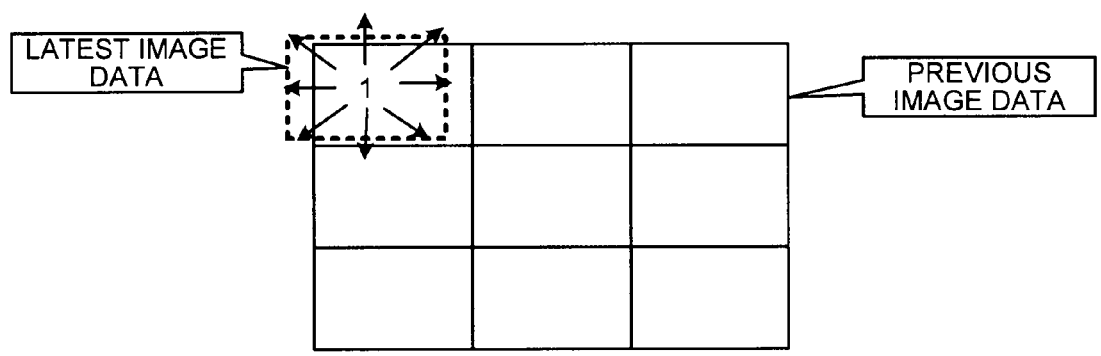
FIG. 10 is a diagram illustrating an example of the division of an image into a plurality of areas.
FIGS. 11A and 11B are image diagrams illustrating the detection of movement in the divided areas.

The movement detecting unit 201 divides an image into a plurality of areas and performs a movement detecting process for each divided area. Specifically, for example, as shown in FIG. 10, the movement detecting unit 201 divides an image into three equal parts in the vertical direction and the horizontal direction, that is, nine areas A1 to A9. Then, the movement detecting unit 201 stores image data (a plurality of image data items that is output from the CCD 101 in time series) that is continuously acquired in synchronization with the VD signal in a buffer memory of the SDRAM 103 and checks a variation between a plurality of consecutive images in each of the nine divided areas A1 to A9, thereby detecting movement. Specifically, the previous image data is stored in the buffer memory, nine divided areas of the stored image data and nine divided areas of the image data that is acquired lately are obliquely moved relative to each other in the horizontal and vertical directions by the number of pixels, and the pixel difference between the image data items at each position is obtained. Movement to the position where the pixel difference is the minimum is regarded as the movement of the image. It is preferable that the number of pixels moved vary depending on the operation speed of the CPU block 1043. However, the divided areas may be moved by about 10 pixels and then the pixel difference may be checked.

FIGS. 11A and 11B are image diagrams illustrating the detection of movement in the divided area A1. As shown in FIG. 11A, the position where the pixel difference is the minimum is determined on the basis of the detection result of movement and a moving direction is output as shown in FIG. 11B. In the example shown in FIGS. 11A and 11B, the divided area A1 of the latest image data is moved to the right relative to the previous image data and the pixel difference is the minimum at that position. Therefore, the right direction is output as the moving direction. In FIG. 11B, only the moving direction is output. However, it is preferable that the number of pixels deviating from the position where the pixel difference is the minimum is detected and the amount of movement of the image is output. The movement detecting unit 201 performs the above-mentioned process for each divided area and detects the movement of the image in each divided area. Then, the estimating unit 202 of the CPU block 1043 performs the movement detection determining process in Step S301 of FIG. 9 on the basis of the result of the movement detecting process of the movement detecting unit 201.

Figure 12:
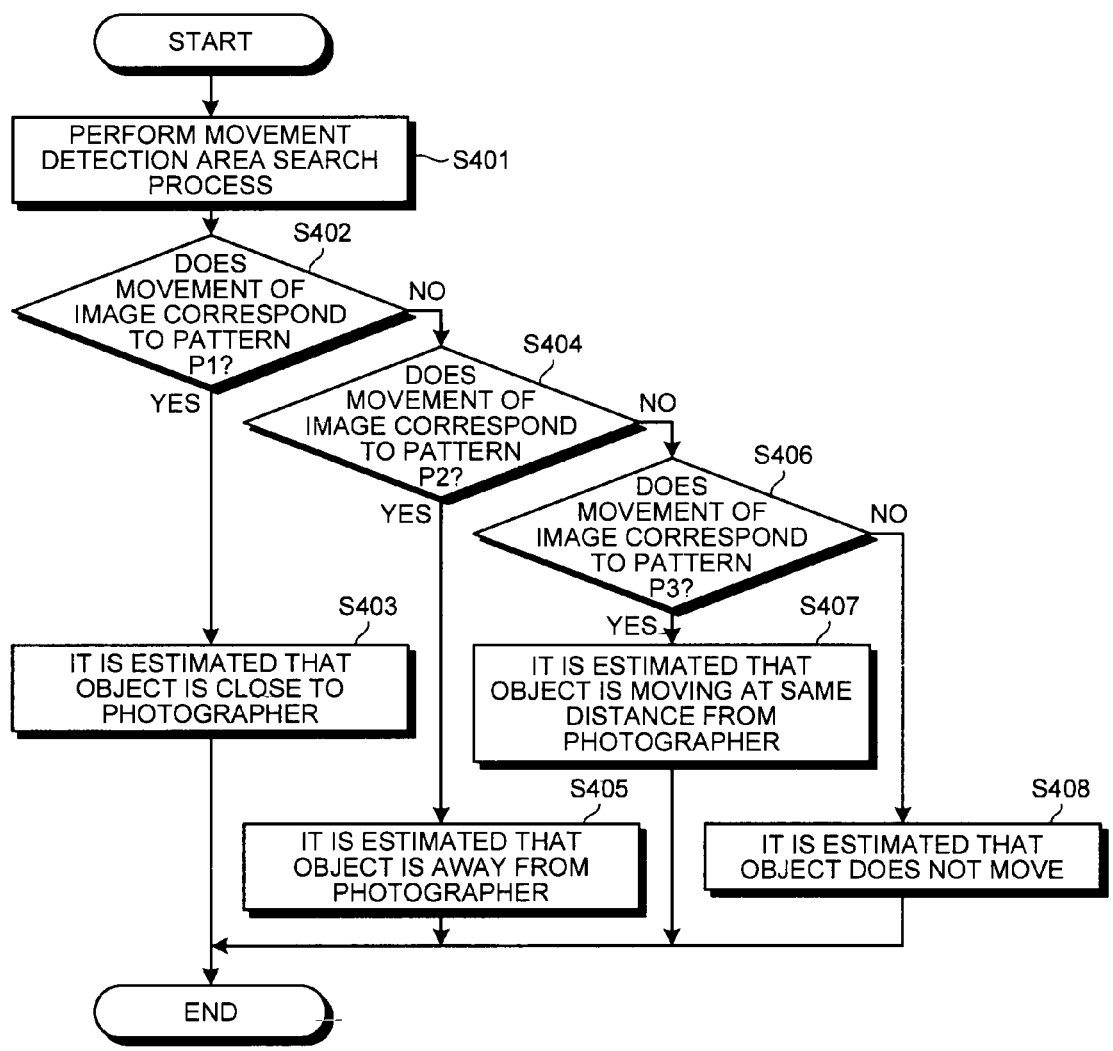
FIG. 12 is a flowchart illustrating the details of a movement detection determining process.
Figure 13A:
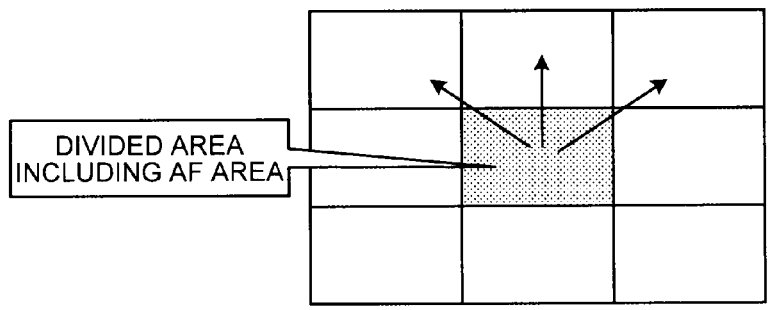
FIGS. 13A to 13C are diagrams illustrating the pattern of the movement of the image in the divided area including the AF area.
Figure 13B:
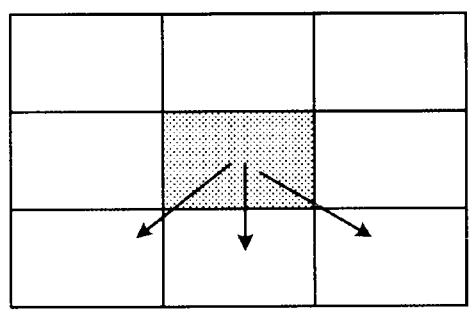
Figure 13C:
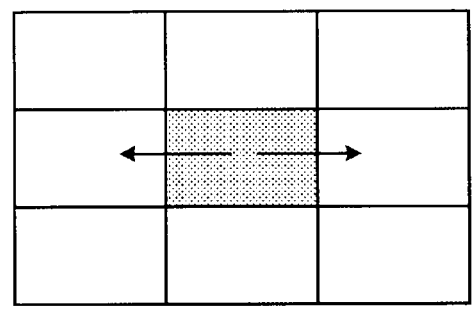

FIG. 12 is a flowchart illustrating the details of the movement detection determining process in Step S301 of FIG. 9. First, the estimating unit 202 performs a process of searching for a movement detection region (Step S401). This process is to determine the moving direction of the image in the divided area (in this embodiment, the divided area A5 at the center of the image) including the AF area. The moving direction can be divided into some patterns. FIGS. 13A and 13B show an example of the pattern. Movement in a direction (the upward direction of image data) opposite to the gravity direction is referred to as a pattern P1 as shown in FIG. 13A, movement in the gravity direction (the downward direction of image data) is referred to as a pattern P2 as shown in FIG. 13B, and movement in the left-right direction is referred to as a pattern P3 as shown in FIG. 13C. The estimating unit 202 determines one of the patterns P1 to P3 corresponding to the movement of the image in the divided area including the AF area, thereby determining whether the object is moving. When it is determined that the object is moving, the estimating unit 202 estimates whether the object moves in a direction in which it is close to the photographer or a direction in which it is away from the photographer.

That is, first, the estimating unit 202 determines whether the movement of the image in the divided area including the AF area corresponds to the pattern P1 (Step S402). When it is determined that the movement of the image corresponds to the pattern P1 (Step S402: YES), the estimating unit 202 estimates that the object is moving in the direction in which it is close to the photographer (Step S403). On the other hand, when it is determined that the movement of the image in the divided area including the AF area does not correspond to the pattern P1 (Step S402: NO), the estimating unit 202 determines whether the movement of the image in the divided area including the AF area corresponds to the pattern P2 (Step S404). When it is determined that the movement of the image corresponds to the pattern P2 (Step S404: YES), the estimating unit 202 estimates that the object is moving in the direction in which it is away from the photographer (Step S405). On the other hand, when it is determined that the movement of the image in the divided area including the AF area does not correspond to the pattern P2 (Step S404: NO), the estimating unit 202 determines whether the movement of the image in the divided area including the AF area corresponds to the pattern P3 (Step S406). When it is determined that the movement of the image corresponds to the pattern P3 (Step S406: YES), the estimating unit 202 estimates that the object is moving at the same distance from the photographer (Step S407). On the other hand, when it is determined that the movement of the image does not correspond to the pattern P3 (Step S406: NO), the estimating unit 202 estimates that the object does not move (Step S408).

When the movement detection determining process of the estimating unit 202 in Step S301 ends, the CPU block 1043 determines whether the object is estimated to move by the movement detection determining process of the estimating unit 202 (Step S302). When it is estimated that the object moves (Step S302: YES), the CPU block 1043 moves the process to the next Step S303. On the other hand, when it is estimated that the object does not move by the movement detection determining process (Step S302: NO), the CPU block 1043 ends the focus position detecting process in the tracking AF mode without performing the subsequent process.

Figure 14A:
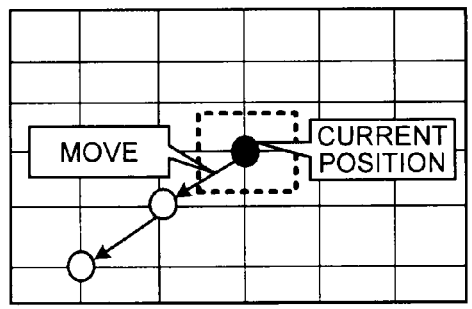
FIGS. 14A and 14B are diagrams illustrating the movement of a tracking area, which is a range in which template matching is performed.
Figure 14B:
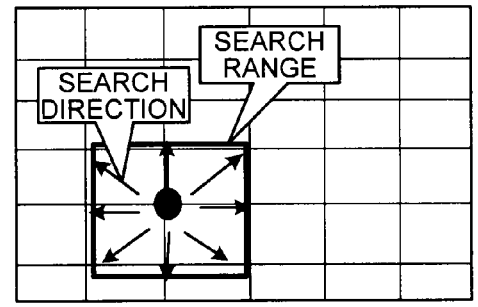

In Step S303, the CPU block 1043 ends the movement detecting process of the movement detecting unit 201 once. Then, the CPU block 1043 performs an object tracking process (Step S304). For the object tracking process, template matching that uses the image information of the object as a template in the moving direction of the object is performed. FIGS. 14A and 14B show the movement of a tracking area, which is a range in which the template matching is performed. The moving direction of the object is output by the movement detecting process (as shown in FIG. 14A, it is assumed that the object is moving to the lower left side). Therefore, the CPU block 1043 searches for the position where the pixel difference from the image data of the object is the minimum in the tracking area in all directions while moving the tracking area in the moving direction of the object and determines the position where the pixel difference from the image data of the object is the minimum to be the current position of the object. When the pixel difference in the tracking area in all directions is equal to or more than a reference value, the CPU block 1043 performs the matching process while moving the tracking area in the direction in which movement is detected.

Then, the CPU block 1043 moves the AF area to the position of the object tracked by the tracking process in Step S304 (Step S305). Then, the focus position detection range setting unit 203 of the CPU block 1043 sets the focus position detection range in which the AF operation is performed on the AF area (Step S306).

Figures 15, 16:
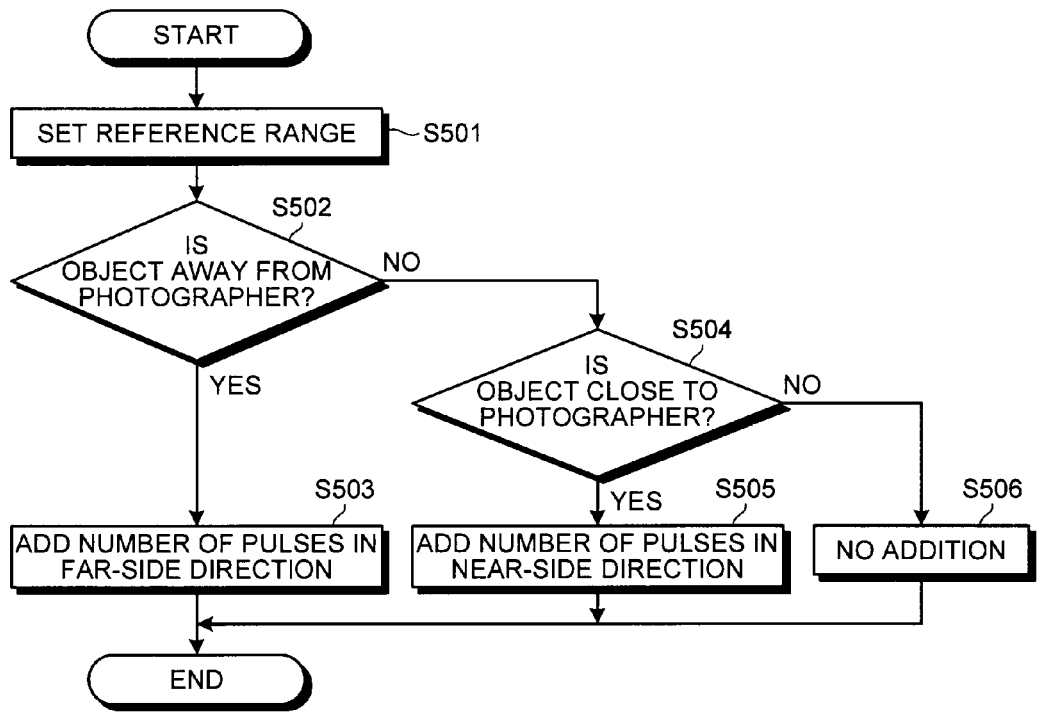
FIG. 15 is a flowchart illustrating the details of a focus position detection range setting process.
FIG. 16 is a diagram illustrating an example of a reference range of a focus position detection range in the AF mode.

FIG. 15 is a flowchart illustrating the details of the focus position detection range setting process of the focus position detection range setting unit 203 in Step S306 of FIG. 9. First, the focus position detection range setting unit 203 sets the reference range of the focus position detection range in the tracking AF mode (Step S501). The reference range of the focus position detection range in the AF mode depends on the focal length of the digital still camera or the F-number of the lens. In this embodiment, as shown in the table of FIG. 16, the reference range of the focus position detection range in the tracking mode is set by the focal length (on the wide-angle side or the telephoto side) and the current position of the focus lens 42a. For example, when the focal length is on the wide-angle side and the current position of the focus lens 42a is 2.5 m away from the infinite position (∞), a range that is a distance corresponding to 10 pulses of the focus motor 42b away from the current position of the focus lens 42a is set as the reference range.

Then, the focus position detection range setting unit 203 determines whether the object is estimated to be away from the photographer by the movement detection determining process of the estimating unit 202 (Step S502). When it is estimated that the object is away from the photographer (Step S502: YES), the focus position detection range setting unit 203 adds the number of pulses in the far-side direction to the reference range set in Step S501 to set the focus position detection range (Step S503). On the other hand, when it is not estimated that the object is away from the photographer (Step S502: NO), the focus position detection range setting unit 203 determines whether the object is estimated to be close to the photographer (Step S504). When it is estimated that the object is close to the photographer (Step S504: YES), the focus position detection range setting unit 203 adds the number of pulses in the near-side direction to the reference range set in Step S501 to set the focus position detection (Step S505). On the other hand, when it is not estimated that the object is close to the photographer (Step S504: NO), that is, when it is estimated that the object is moving at the same distance from the photographer or when it is estimated that the object does not move, the focus position detection range setting unit 203 uses the reference range set in Step S501 as the focus position detection range without adding the number of steps (Step S506).

Figures 17, 18:
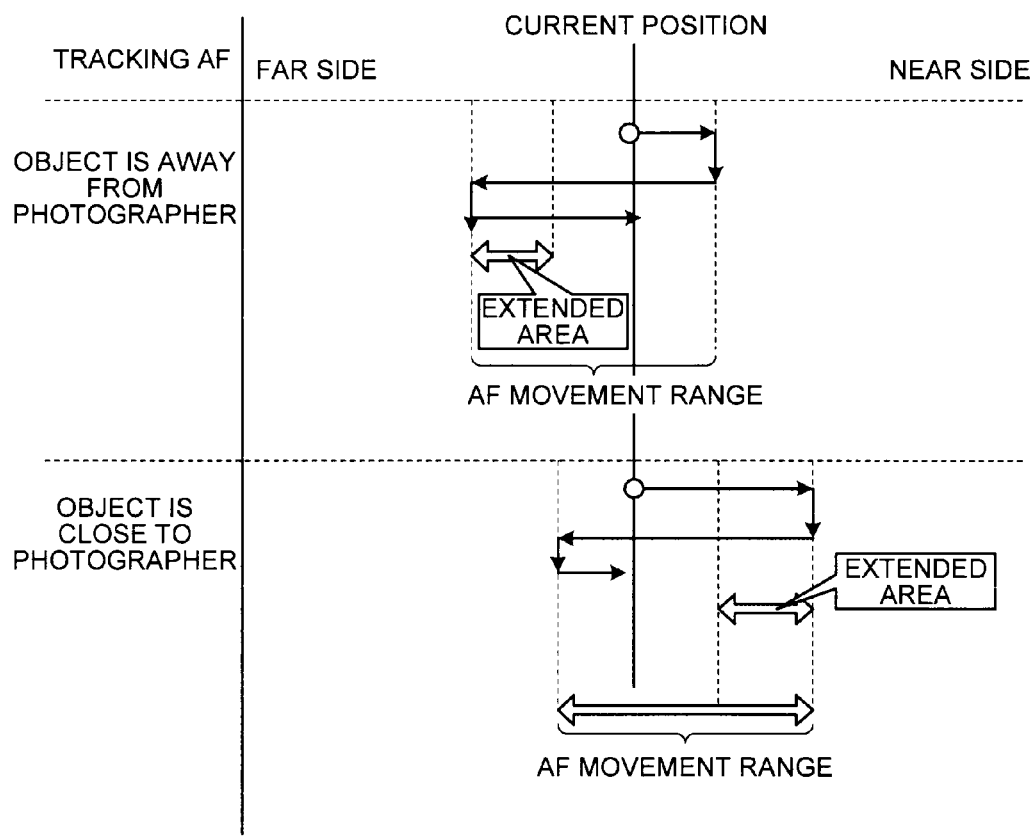
FIG. 17 is a diagram illustrating an example of the number of pulses added to the reference range of the focus position detection range.
FIG. 18 is a diagram illustrating a method of driving the focus lens when the focus position detection range varies depending on the movement of the object during the AF operation in the tracking AF mode.

In this embodiment, as shown in the table of FIG. 17, the number of pulses added in Step S503 or Step S505 is determined by the focal length (on the wide-angle side or the telephoto side) and the current position of the focus lens 42a. For example, in the case in which the focal length is on the wide-angle side and the current position of the focus lens 42a is 2.5 m away from the infinite position (∞), when it is estimated that the object is away from the photographer, two pulses are added to the far side. On the other hand, when it is estimated that the object is close to the photographer, four pulses are added to the near side.

FIG. 18 shows a method of driving the focus lens 42a when the focus position detection range varies with the movement of the object during the AF operation in the tracking AF mode. As shown in FIG. 18, in this embodiment, the focus position detection range (the movement range of the focus lens 42a) is extended in the far-side direction or the near-side direction with the movement of the object during the AF operation in the tracking AF mode. In this way, even when the object moves in the depth direction of the screen, it is possible to perform an appropriate AF operation without losing the focus position.

When the focus position detection range setting process of the focus position detection range setting unit 203 in Step S306 ends, the focus position detecting unit 204 of the CPU block 1043 performs a starting position moving process (Step S307) to move the position of the focus lens 42a to a movement starting position. For example, the movement starting position is at half the focus position detection range in the near-side direction from the current position of the focus lens 42a. When pulses are added in the near-side direction, the movement starting position is the pulse-added position.

Then, the focus position detecting unit 204 performs a lens driving process (Step S308) to move the focus lens 42a step by step in the far-side direction in the focus position detection range. Then, an AF evaluation value acquiring process (Step S309) is performed to acquire the AF evaluation value of the AF area at each moved position. The movement distance of the focus lens 42a corresponding to one step is the same as that in the normal AF mode. When the focal length is on the wide-angle side, the focus motor 42b is driven at an interval of one pulse. When the focal length is on the telephoto side, the focus motor 42b is driven at an interval of two pulses and the AF evaluation value is acquired at each position. The focus position detecting unit 204 repeatedly performs the lens driving process of Step S308 and the AF evaluation value acquiring process of Step S309 until the focus lens 42a reaches the end position of the focus position detection range (Step S310: NO). When the focus lens 42a reaches the end position of the focus position detection range (Step S310: YES), the process proceeds to Step S311.

In Step S311, the focus position detecting unit 204 performs a focus position determining process. In the focus position determining process, similar to the focus position determining process in the normal AF mode, the reliability of the AF evaluation value acquired at each moved position of the focus lens 42a is evaluated and the peak position in the AF evaluation value is determined. When a reliable peak position is detected, the position of the focus lens 42a is stored as the focus position in, for example, the local SRAM 1044 and it is determined that focusing is OK. On the other hand, when no reliable peak position is detected, it is determined that focusing is NG.

Finally, the CPU block 1043 performs an area display process (Step S312) and ends the focus position detecting process in the tracking AF mode. In the area display process, similar to the area display process in the normal AF mode, when it is determined that focusing is OK in the focus determining process of Step S311, the CPU block 1043 displays the focus frame F indicating the focus position on, for example, the LCD monitor 9 so as to be superimposed on the finder image. When it is determined that focusing is NG in the focus determining process of Step S311, the CPU block 1043 displays the focus frame F on, for example, the LCD monitor 9 so as not to be superimposed on the finder image.

When the focus position detecting process (the process shown in the flowchart of FIG. 7) in the normal AF mode in Step S107 of FIG. 5 or the focus position detecting process (the process shown in the flowchart of FIG. 9) in the tracking AF mode in Step S108 ends, the CPU block 1043 determines whether focusing is OK in the focus position detecting process (Step S109). When it is determined that focusing is OK (Step S109: YES), the CPU block 1043 determines whether the focus position detecting process in the tracking AF mode is performed (Step S110). When it is determined that focusing is OK in the focus position detecting process in the tracking AF mode (Step S109: YES, Step S110: YES), the CPU block 1043 turns on the tracking flag (Step S111) and resumes the movement detecting process that has been ended in the focus position detecting process in the tracking AF mode (Step S112).

When it is determined that focusing is NG in the focus position detecting process (Step S109: NO) or when it is determined that focusing is OK in the focus position detecting process in the normal AF mode (Step S109: YES, Step S110: NO), the CPU block 1043 turns off the tracking flag (Step S113).

Finally, the CPU block 1043 performs a focus position moving process (Step S114) to move the focus lens 42*a* to the position that has been detected as the focus position in the focus position detecting process. When it is determined that focusing is NG in the focus position detecting process, the CPU block 1043 moves the focus lens 42*a* to a position corresponding to an NG distance. In general, a hyperfocal length is used as the NG distance. In this embodiment, for example, the focus lens 42*a* is moved to a position that is 2.5 m away from the infinite position.

Figure 19:
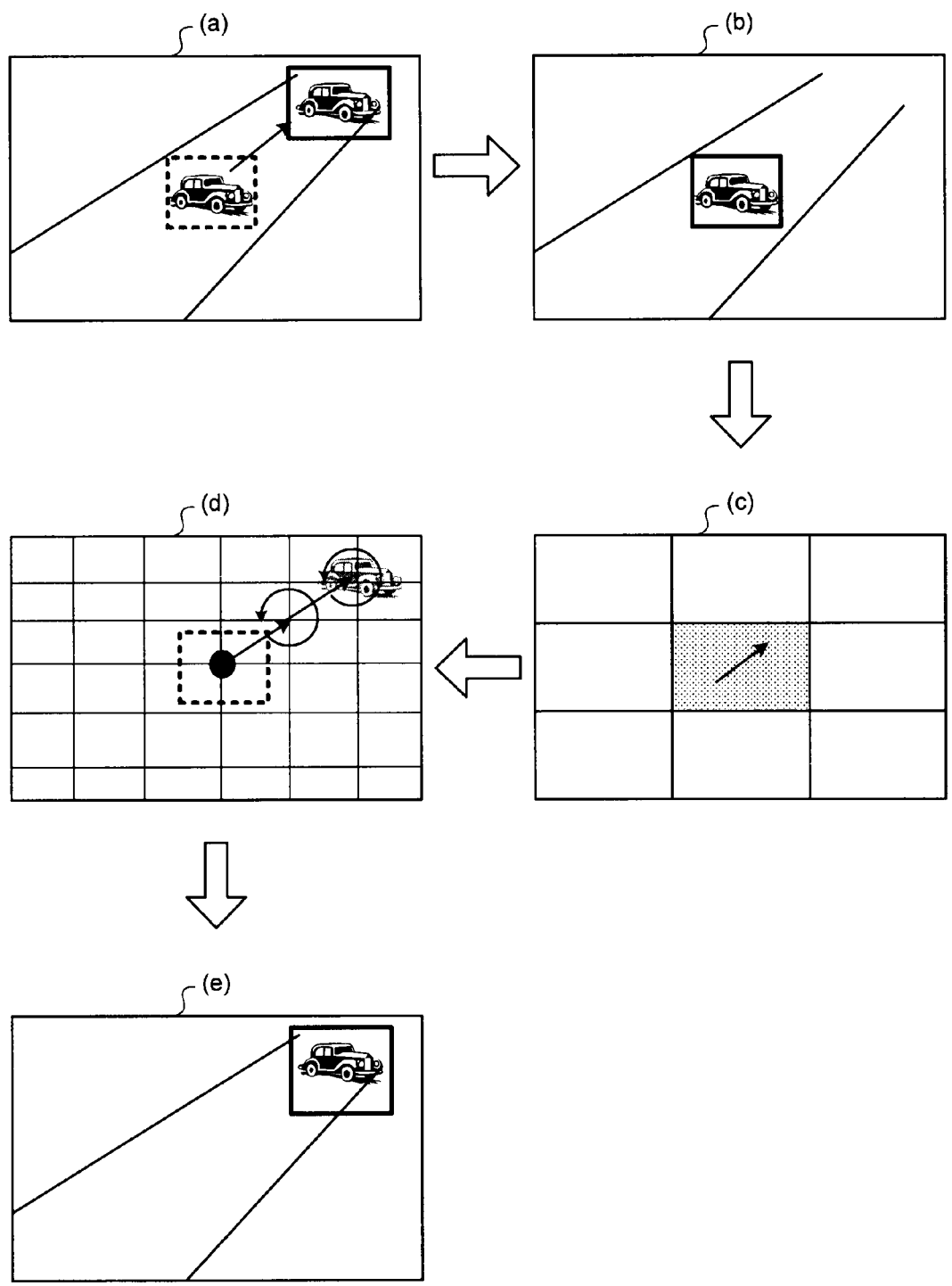
FIG. 19 is a diagram illustrating an image in a series of processes when the object moves in a pattern P1.
Figure 20:
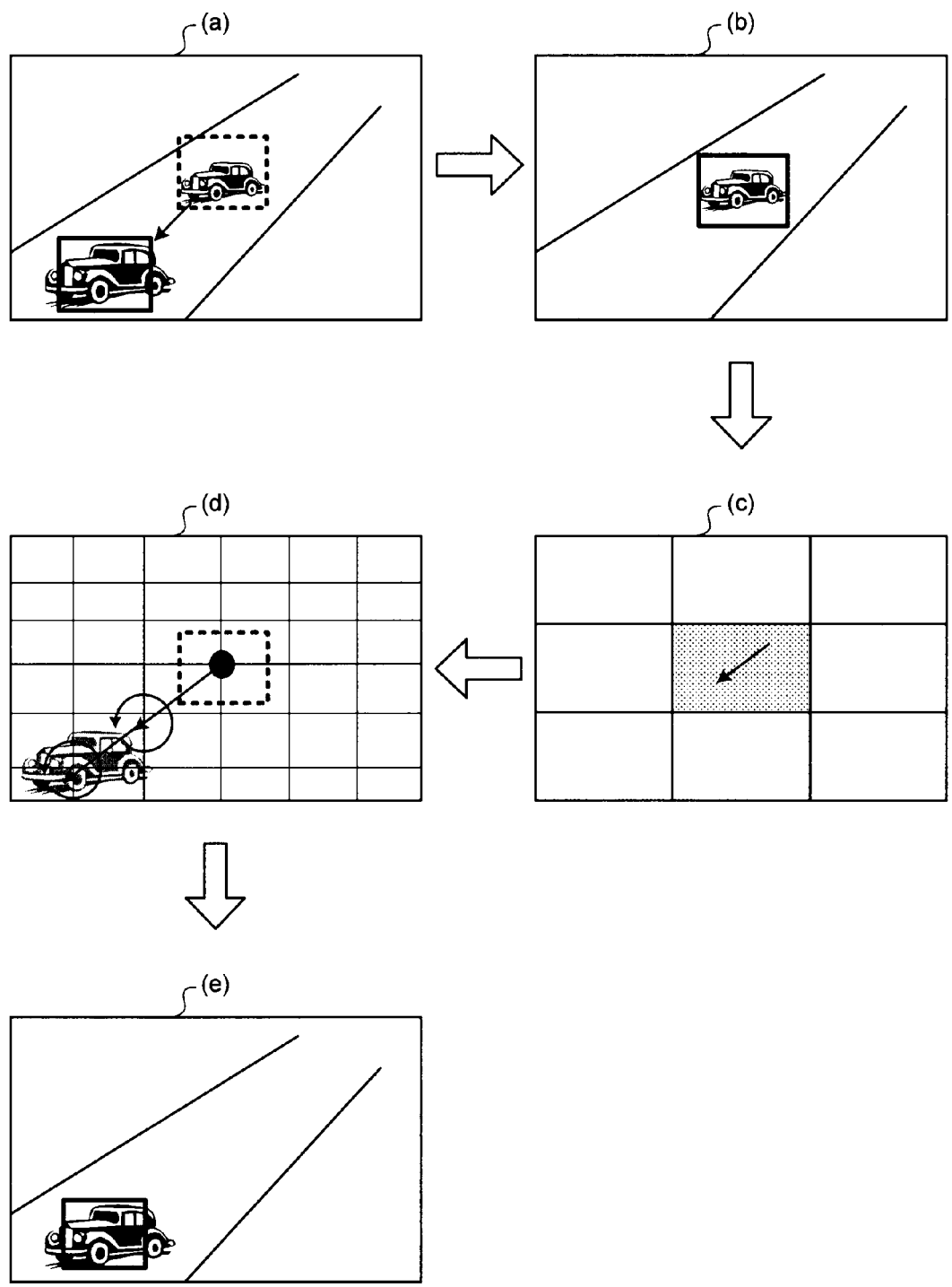
FIG. 20 is a diagram illustrating an image in a series of processes when the object moves in a pattern P2.
Figure 21:
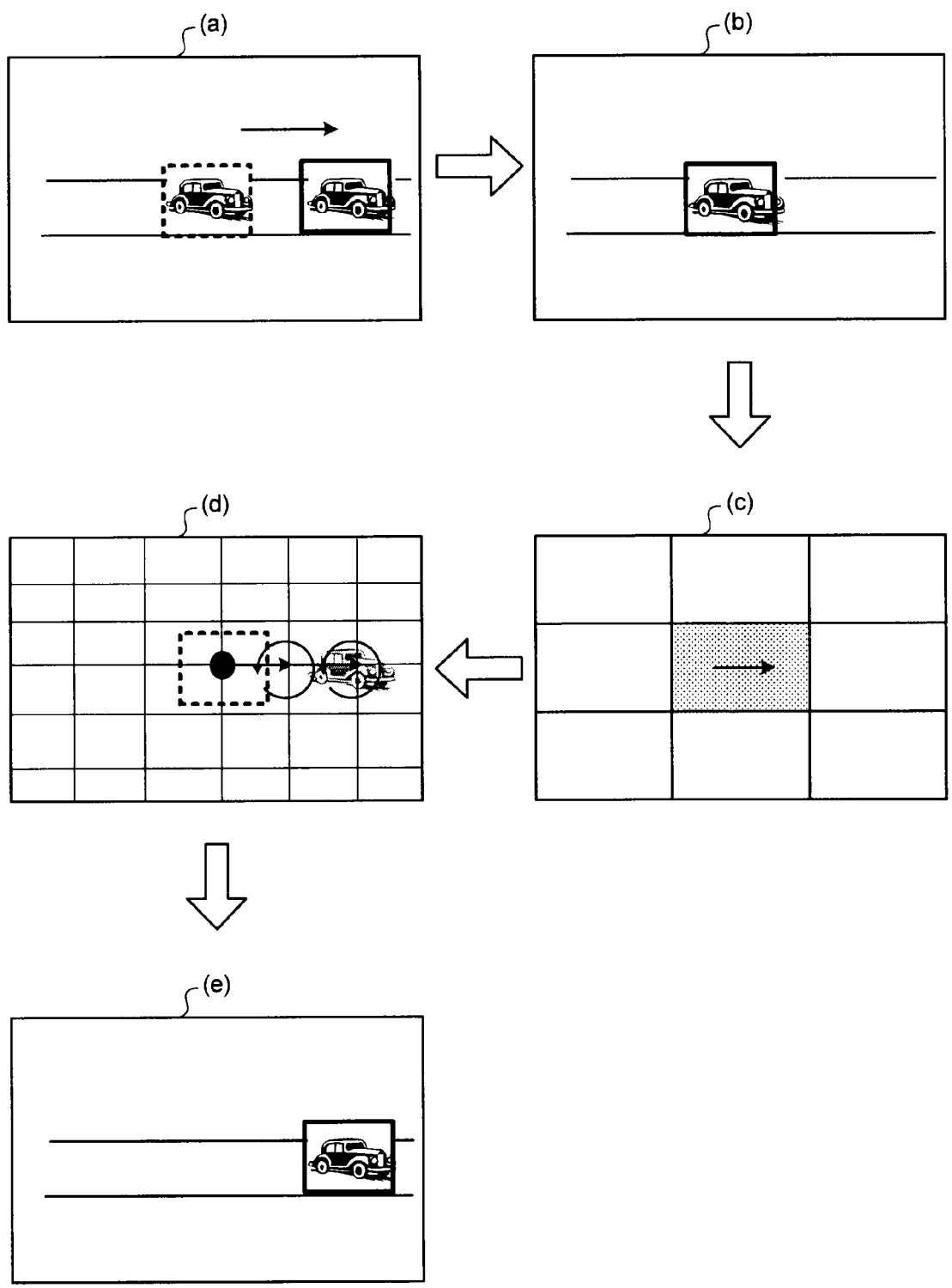
FIG. 21 is a diagram illustrating an image in a series of processes when the object moves in a pattern P3.

FIGS. 19 to 21 show images in a series of processes according to this embodiment. FIG. 19 shows an example in which the object moves in the pattern P1. FIG. 20 shows an example in which the object moves in the pattern P2. FIG. 21 shows an example in which the object moves in the pattern P3. When the object moves as shown in FIGS. 19(*a*), 20(*a*), and 21(*a*) and the AF area is set as shown in FIGS. 19(*b*), 20(*b*), and 21(*b*) at the time when the release shutter SW1 is pressed, the movement of the image in the divided block including the AF area is detected as shown in FIGS. 19(*c*), 20(*c*), and 21(*c*). Then, the tracking area is moved as shown in FIGS. 19(*d*), 20(*d*), and 21(*d*), and the tracking of the object using template matching is performed. The AF area is moved to the position of the tracked object as shown in FIGS. 19(*e*), 20(*e*), and 21(*e*) and the AF operation is performed. In this case, the focus position detection range (the movement range of the focus lens 42*a*) during the AF operation is extended to the far side in the example shown in FIG. 19. In the example shown in FIG. 20 the focus position detection range during the AF operation is extended to the near side. In the example shown in FIG. 21, the focus position detection range during the AF operation is not extended.

Second Embodiment

Next, a second embodiment will be described. This embodiment is different from the first embodiment in the content of the movement detection determining process of the estimating unit 202 in Step S301 and the content of the focus position detection range setting process of the focus position detection range setting unit 203 in Step S306 during the focus position detecting process in the tracking AF mode shown in the flowchart of FIG. 9. The other structures of this embodiment are the same as those of the first embodiment. Therefore, only the difference between the second embodiment and the first embodiment will be described below.

Figure 22:
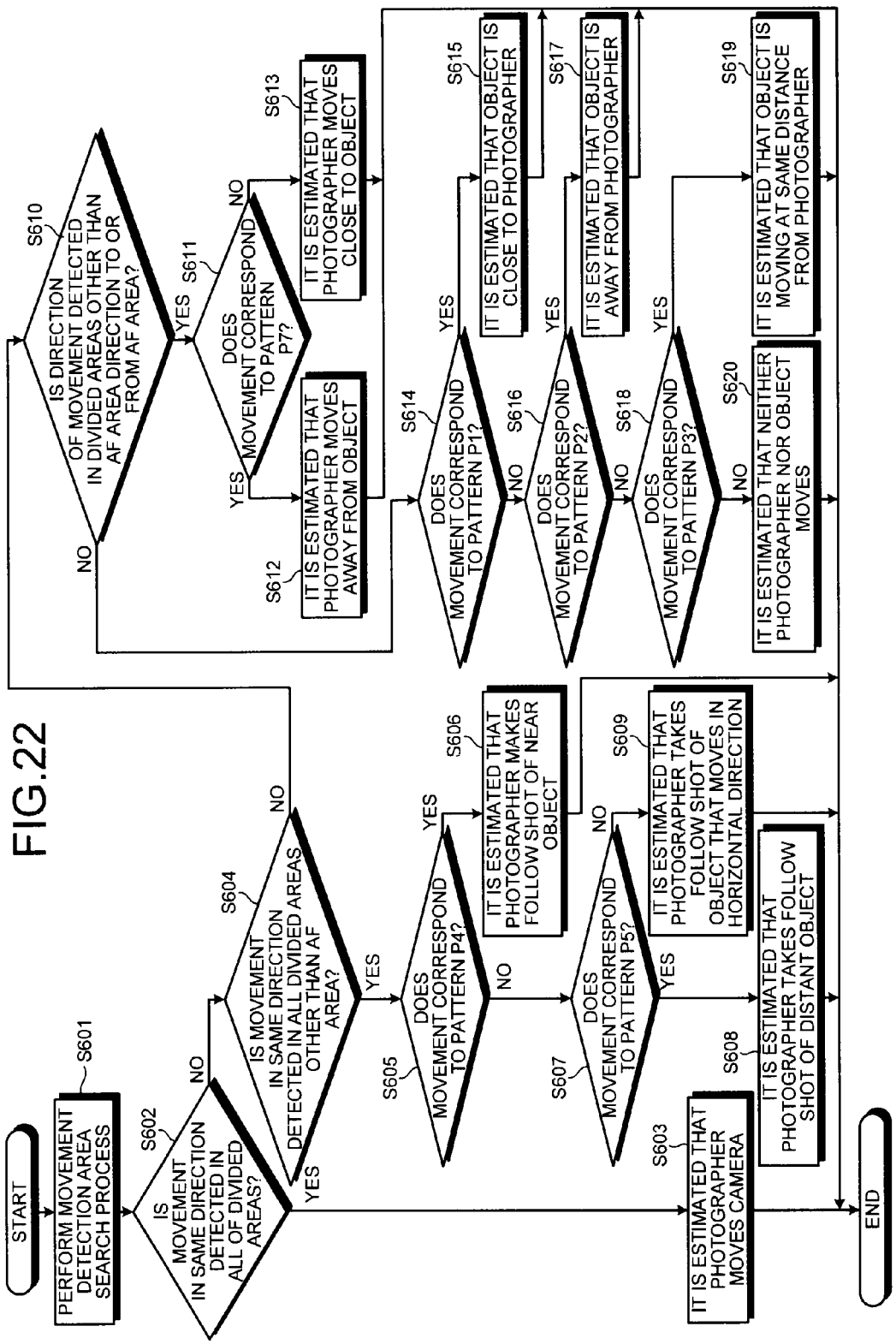
FIG. 22 is a flowchart illustrating the details of a movement detection determining process according to a second embodiment.
Figure 23A:
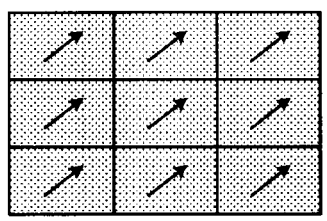
FIGS. 23A to 23H are diagrams illustrating the pattern of the movement of each divided area when the photographer moves the digital still camera to change the composition of the object.
Figure 23B:
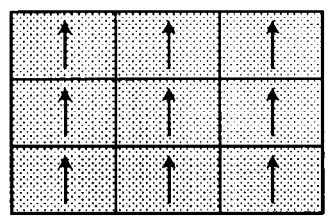
Figure 23C:
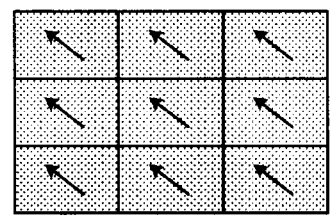
Figure 23D:
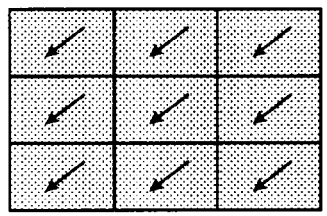
Figure 23E:
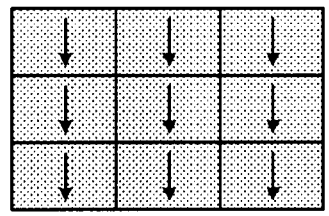
Figure 23F:
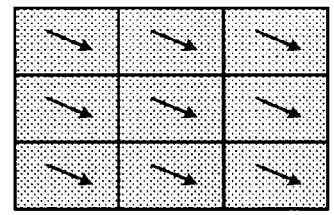
Figure 23G:
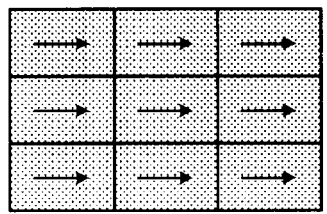
Figure 23H:
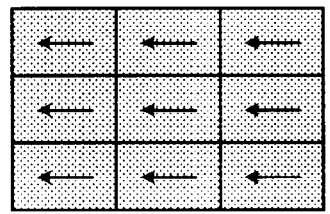

FIG. 22 is a flowchart illustrating the details of a movement detection determining process of the determining unit 202 according to the second embodiment. In the movement detection determining process according to the second embodiment, first, the estimating unit 202 performs a process of searching for a movement detection region (Step S601). The search process determines the moving direction of an image in each of the nine divided areas to be subjected to the movement detecting process, thereby estimating the movement of the object or the photographer.

Specifically, first, the estimating unit 202 determines whether the movement of the image in the same direction is detected in all of the nine divided areas (Step S602). This corresponds to a case in which the photographer moves the digital still camera to change the composition of the object. FIGS. 23A to 23H show the pattern of the movement of each divided area when the photographer moves the digital still camera to change the composition of the object. As shown in FIGS. 23A to 23H, when the photographer moves the digital still camera to change the composition of the object, movement in the same direction is detected in all of the nine divided areas. The estimating unit 202 determines whether movement in the same direction is detected in all of the nine divided areas. When movement in the same direction is detected in all of the divided areas (Step S602: YES), the estimating unit 202 estimates that the photographer moves the digital still camera to change the composition of the object (Step S603).

Figure 24A:
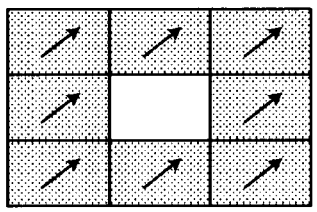
FIGS. 24A to 24H are diagrams illustrating the pattern of the movement of each divided area when the photographer takes a follow shot of a moving object.
Figure 24B:
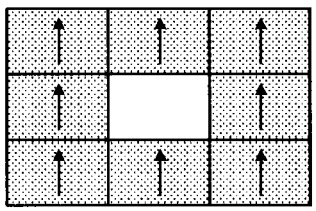
Figure 24C:
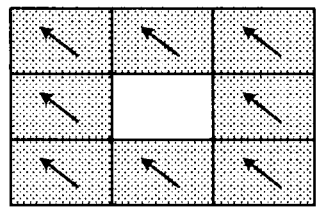
Figure 24D:
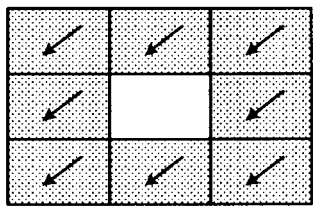
Figure 24E:
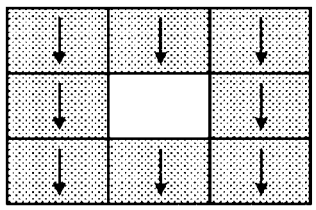
Figure 24F:
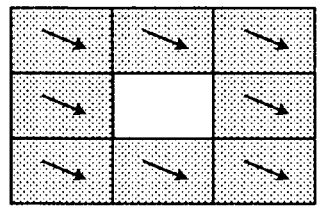
Figure 24G:
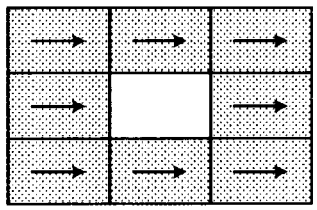
Figure 24H:
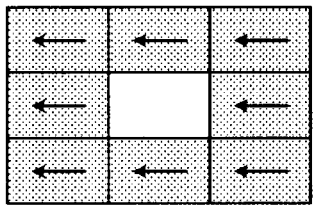

On the other hand, when movement in the same direction is not detected in all of the divided areas (Step S602: NO), the estimating unit 202 determines whether movement is not detected in the divided area including the AF area and movement in the same direction is detected in the divided areas other than the divided area including the AF area (Step S604). This corresponds to a case in which the photographer makes a follow shot of a moving object. FIGS. 24A to 24H show the pattern of the movement of each divided area when the photographer makes a follow shot to track a moving object. The movement of each divided area in the follow shot is classified into a pattern (hereinafter, referred to as a pattern P4) in which movement in a direction (the upper direction of image data) opposite to the gravity direction is detected in the divided areas other than the divided area including the AF area as shown in FIGS. 24A to 24C, a pattern (hereinafter, referred to as a pattern P5) in which movement in the gravity direction (the downward direction of image data) is detected in the divided areas other than the divided area including the AF area as shown in FIGS. 24D to 24F, and a pattern (hereinafter, referred to as a pattern P6) in which movement in the left-right direction is detected in the divided areas other than the divided area including the AF area as shown in FIGS. 24G and 24H.

The estimating unit 202 determines whether movement in the same direction is detected in the divided areas other than the divided area including the AF area. When movement in the same direction is detected in the divided areas other than the divided area including the AF area (Step S604: YES), the estimating unit 202 determines whether the movement of the image corresponds to the pattern P4 (Step S605). When it is determined that the movement of the image corresponds to the pattern P4 (Step S605: YES), the estimating unit 202 estimates that the photographer makes a follow shot of a near object (Step S606). On the other hand, when it is determined that the movement of the image does not correspond to the pattern P4 (Step S605: NO), the estimating unit 202 determines whether the movement of the image corresponds to the pattern P5 (Step S607). When it is determined that the movement of the image corresponds to the pattern P5 (Step S607: YES), the estimating unit 202 estimates that the photographer takes a follow shot of a distant object (Step S608). When it is determined that the movement of the image does not correspond to the pattern P5, that is, when it is determined that the movement of the image corresponds to the pattern P6 (Step S607: NO), the estimating unit 202 estimates that the photographer takes a follow shot of an object that is moving in the horizontal direction (Step S609).

Figure 25A:
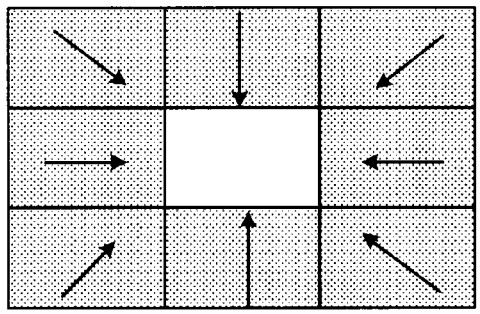
FIGS. 25A and 25B are diagrams illustrating the pattern of the movement of each divided area when the photographer moves close to or away from the object at rest.
Figure 25B:
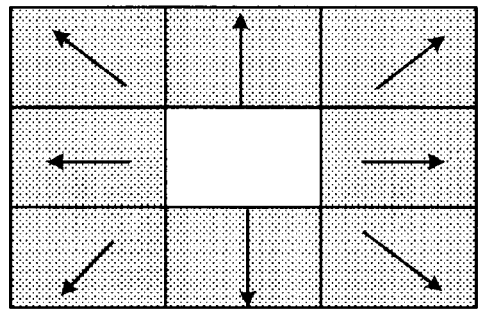

On the other hand, when movement in the same direction is not detected in the divided areas other than the divided area including the AF area (Step S604: NO), the estimating unit 202 determines whether the direction of the movement detected in the divided areas other than the divided area including the AF area is a direction to or from the divided area including the AF area (Step S610). This corresponds to a case in which the photographer moves close to or away from an object at rest. FIGS. 25A and 25B show the pattern of the movement of each divided area when the photographer moves close to or away from the object at rest. The movement of each divided area when the photographer moves in this way is classified into a pattern (hereinafter, referred to as a pattern P7) in which movement to the divided area including the AF area is detected in the divided areas other than the divided area including the AF area as shown in FIG. 25A and a pattern (hereinafter, referred to as a pattern P8) in which movement away from the divided area including the AF area is detected in the divided areas other than the divided area including the AF area as shown in FIG. 25B.

When the direction of the movement detected in the divided areas other than the divided area including the AF area is the direction to or from the divided area including the AF area (Step S610: YES), the estimating unit 202 determines whether the movement of the image corresponds to the pattern P7 (Step S611). When it is determined that the movement of the image corresponds to the pattern P7 (Step S611: YES), the estimating unit 202 estimates that the photographer moves away from the object (Step S612). On the other hand, when it is determined that the movement of the image does not correspond to the pattern P7, that is, when it is determined that the movement of the image corresponds to the pattern P8 (Step S611: NO), the estimating unit 202 estimates that the photographer moves close to the object (Step S613).

When movement to or from the divided area including the AF area is not detected in the divided areas other than the divided area including the AF area (Step S610: NO), the estimating unit 202 determines one of the patterns P1 to P3 shown in FIGS. 13A to 13C corresponding to the movement of the image in the divided area including the AF area, similar to the first embodiment, thereby determining whether the object is moving. When it is determined that the object is moving, the estimating unit 202 estimates whether the object is moving in a direction in which it is close to the photographer or a direction in which it is away from the photographer in distance.

That is, first, the estimating unit 202 determines whether the movement of the image in the divided area including the AF area corresponds to the pattern P1 (Step S614). When it is determined that the movement of the image corresponds to the pattern P1 (Step S614: YES), the estimating unit 202 estimates that the object is moving in the direction in which it is close to the photographer (Step S615). On the other hand, when it is determined that the movement of the image in the divided area including the AF area does not correspond to the pattern P1 (Step S614: NO), the estimating unit 202 determines whether the movement of the image in the divided area including the AF area corresponds to the pattern P2 (Step S616). When it is determined that the movement of the image corresponds to the pattern P2 (Step S616: YES), the estimating unit 202 estimates that the object is moving in the direction in which it is away from the photographer (Step S617). On the other hand, when it is determined that the movement of the image in the divided area including the AF area does not correspond to the pattern P2 (Step S616: NO), the estimating unit 202 determines whether the movement of the image in the divided area including the AF area corresponds to the pattern P3 (Step S618). When it is determined that the movement of the image corresponds to the pattern P3 (Step S618: YES), the estimating unit 202 estimates that the object is moving at the same distant from the photographer (Step S619). When it is determined that the movement of the image does not correspond to the pattern P3 (Step S618: NO), the estimating unit 202 estimates that neither the photographer nor the object moves (Step S620).

Figure 26:
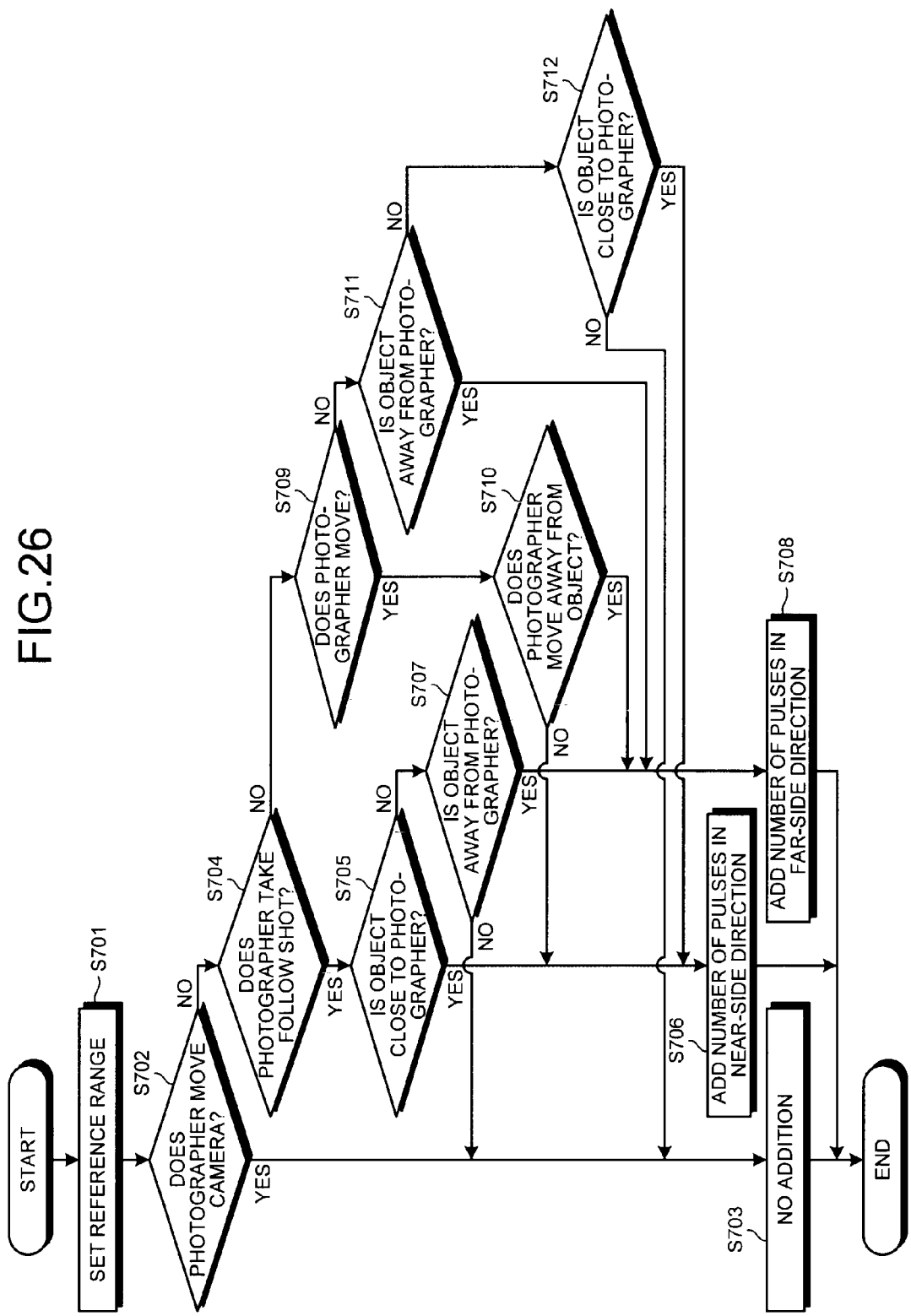
FIG. 26 is a flowchart illustrating the details of a focus position detection range setting process according to the second embodiment.

FIG. 26 is a flowchart illustrating the details of the focus position detection range setting process of the focus position detection range setting unit 203 according to the second embodiment. In the focus position detection range setting process according to the second embodiment, first, the focus position detection range setting unit 203 sets the reference range of the focus position detection range in the tracking AF mode (Step S701). The reference range of the focus position detection range in the AF mode depends on the focal length (on the wide-angle side or the telephoto side) and the current position of the focus lens 42a, similar to the first embodiment. For example, when the focal length is on the wide-angle side and the current position of the focus lens 42a is 2.5 m away from the infinite position (∞), a range that is a distance corresponding to 10 pulses of the focus motor 42b away from the current position of the focus lens 42a is set as the reference range.

Then, the focus position detection range setting unit 203 determines whether it is estimated that the photographer moves the digital still camera to change the composition of the object by the movement detection determining process (Step S702). When it is estimated that the object is away from the photographer (Step S702: YES), the focus position detection range setting unit 203 uses the reference range set in Step S701 as the focus position detection range (Step S703).

On the other hand, when it is not estimated that the photographer moves the digital still camera to change the composition of the object (Step S702: NO), the focus position detection range setting unit 203 determines whether it is estimated that the photographer takes a follow shot (Step S704). When it is estimated that the photographer takes a follow shot (Step S704: YES), the focus position detection range setting unit 203 determines whether the photographer takes a follow shot of a near object (Step S705). When it is estimated that the photographer takes a follow shot of a near object (Step S705: YES), the focus position detection range setting unit 203 adds the number of pulses in the near-side direction to the reference range set in Step S701 to set the focus position detection range (Step S706). When it is estimated that the photographer does not take a follow shot of a near object (Step S705: NO), the focus position detection range setting unit 203 determines whether the photographer takes a follow shot of a distant object (Step S707). When it is determined that the photographer takes a follow shot of a distant object (Step S707: YES), the focus position detection range setting unit 203 adds the number of pulses in the far-side direction to the reference range set in Step S701 to set the focus position detection range (Step S708). When it is estimated that the photographer does not take a follow shot of a distant object, that is, when it is estimated that the photographer takes a follow shot of an object that is moving in the horizontal direction (Step S707: NO), the focus position detection range setting unit 203 uses the reference range set in Step S701 as the focus position detection range (Step S703).

When it is not estimated that the photographer takes a follow shot (Step S704: NO), the focus position detection range setting unit 203 determines whether it is estimated that the photographer is moving in a direction in which the photographer is close to or away from the object at rest (Step S709). When it is estimated that the photographer is moving in the direction in which the photographer is close to or away from the object at rest (Step S709: YES), the focus position detection range setting unit 203 determines that the photographer is moving in the direction in which the photographer is away from the object (Step S710). When it is estimated that the photographer is moving in the direction in which the photographer is away from the object (Step S710: YES), the focus position detection range setting unit 203 adds the number of pulses in the far-side direction to the reference range set in Step S701 to set the focus position detection range (Step S708). When it is estimated that the photographer is not moving in the direction in which the photographer is away from the object, that is, when it is estimated that the photographer is moving to the object (Step S710: NO), the focus position detection range setting unit 203 adds pulses in the near-side direction to the reference range set in Step S701 to set the focus position detection range (Step S706).

When it is not estimated that the photographer is moving in the direction in which the photographer is close to or away from the object at rest (Step S709: NO), the focus position detection range setting unit 203 determines whether the object is estimated to be away from the photographer (Step S711). When it is estimated that the object is away from the photographer (Step S711: YES), the focus position detection range setting unit 203 adds the number of pulses in the far-side direction to the reference range set in Step S701 to set the focus position detection range (Step S708). On the other hand, when it is not estimated that the object is away from the photographer (Step S711: NO), the focus position detection range setting unit 203 determines whether the object is estimated to be close to the photographer (Step S712). When it is estimated that the object is close to the photographer (Step S712: YES), the focus position detection range setting unit 203 adds the number of pulses in the near-side direction to the reference range set in Step S701 to set the focus position detection range (Step S706). On the other hand, when it is not estimated that the object is close to the photographer (Step S712: NO), that is, when the object is moving at the same distance from the photographer or when it is estimated that neither the photographer nor the object moves, the focus position detection range setting unit 203 uses the reference range set in Step S701 as the focus position detection range without adding steps (Step S703).

Similar to the first embodiment, the number of pulses added in Step S706 or Step S708 is determined by the focal length (on the wide-angle side or the telephoto side) and the current position of the focus lens 42a, as represented by the table shown in FIG. 17. For example, when the focal length is on the wide-angle side and the current position of the focus lens 42a is 2.5 m away from the infinite position (∞), two pulses are added to the far side and four pulses are added to the near side. As described above, in this embodiment, the focus position detection range (the movement range of the focus lens 42a) is extended in the far-side direction or the near-side direction with the movement of the photographer or the object during the AF operation in the tracking AF mode. In this way, even when the object is relatively moved in the depth direction of the screen by the movement of the photograph or the object, it is possible to perform an appropriate AF operation without losing the focus position.

Figure 27:
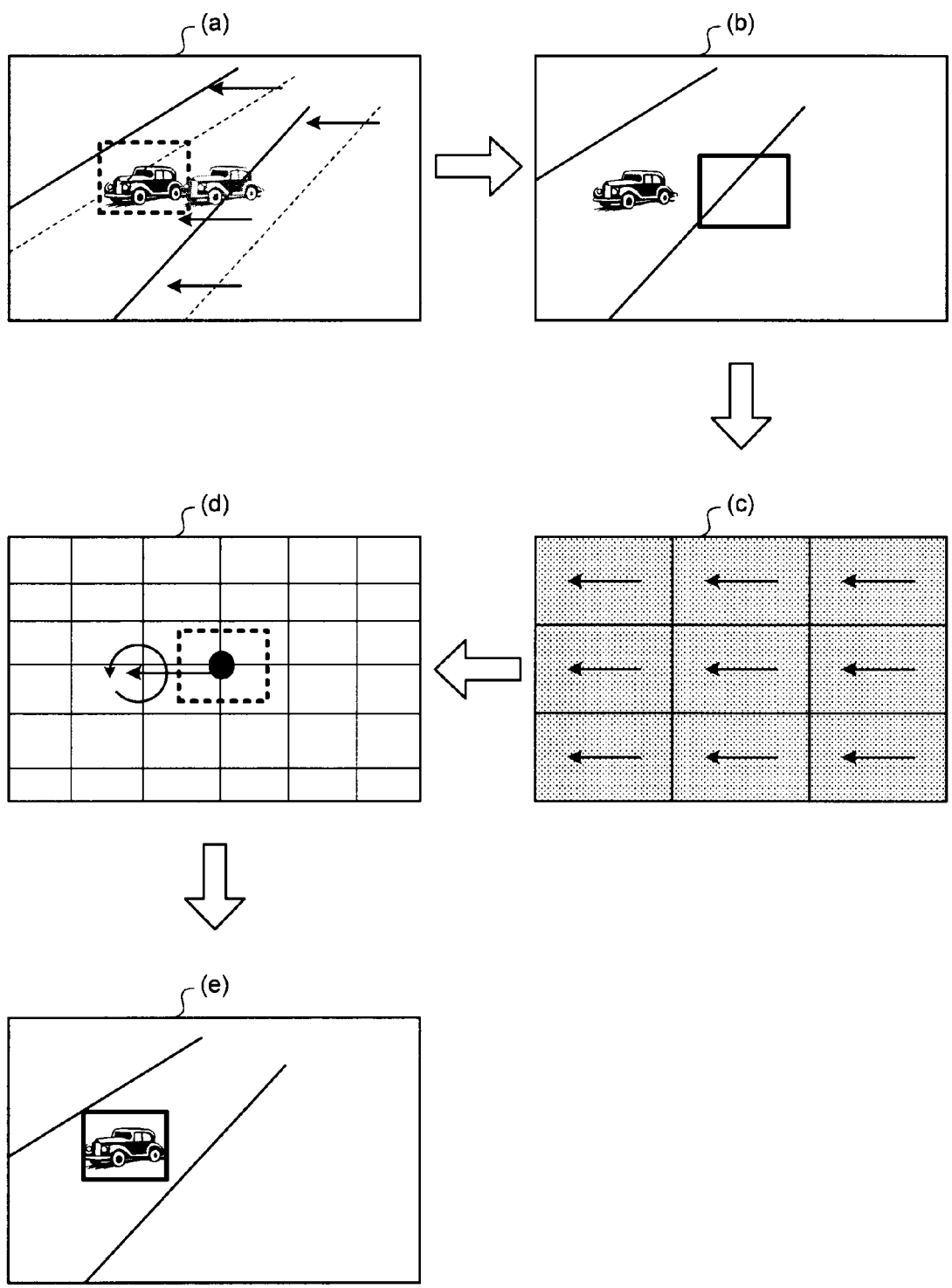
FIG. 27 is a diagram illustrating an image in a series of processes when the photographer moves the digital still camera to change the composition of the object.
Figure 28:
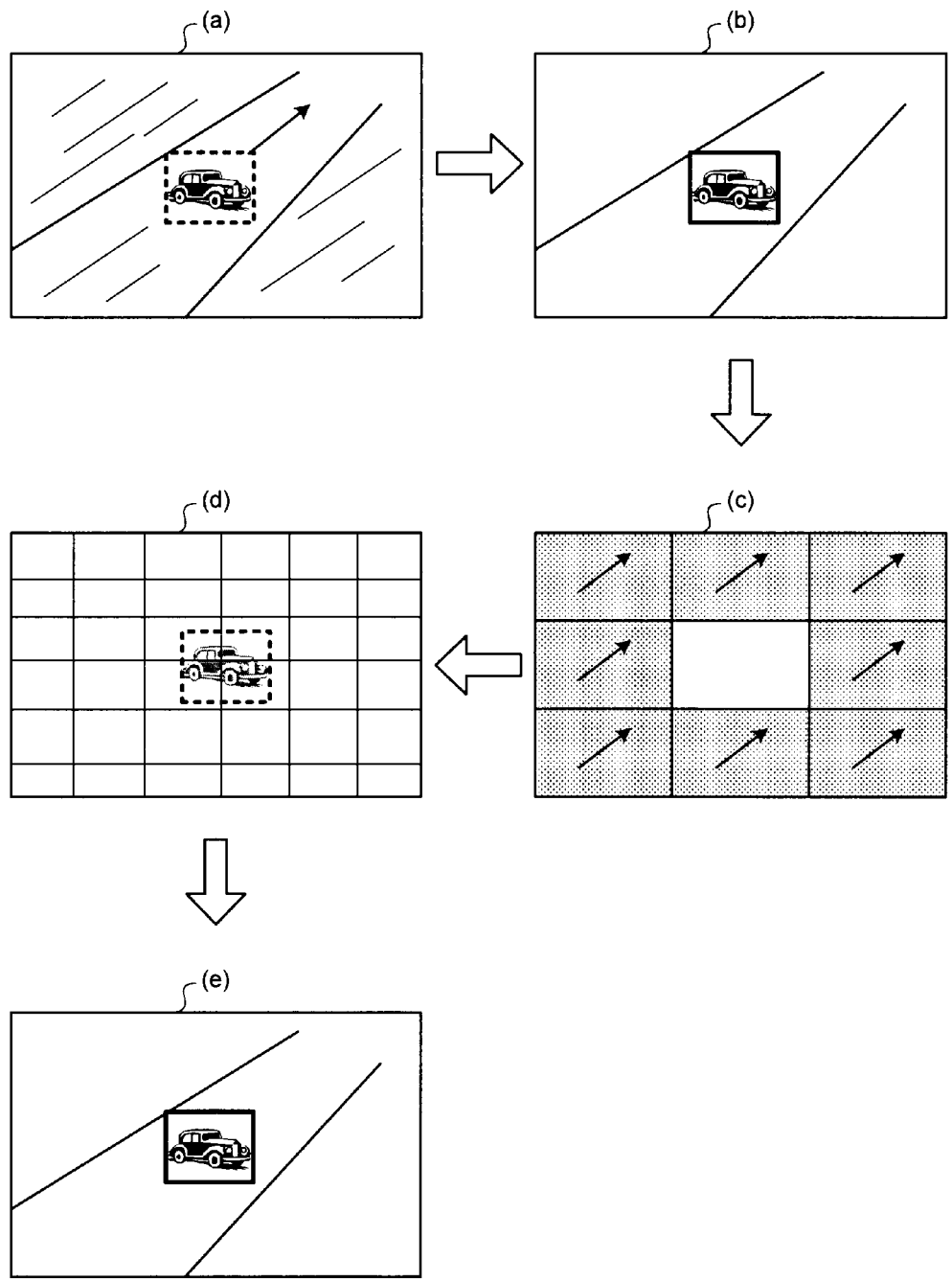
FIG. 28 is a diagram illustrating an image in a series of processes when the photographer takes a flow shot of a distant object.
Figure 29:
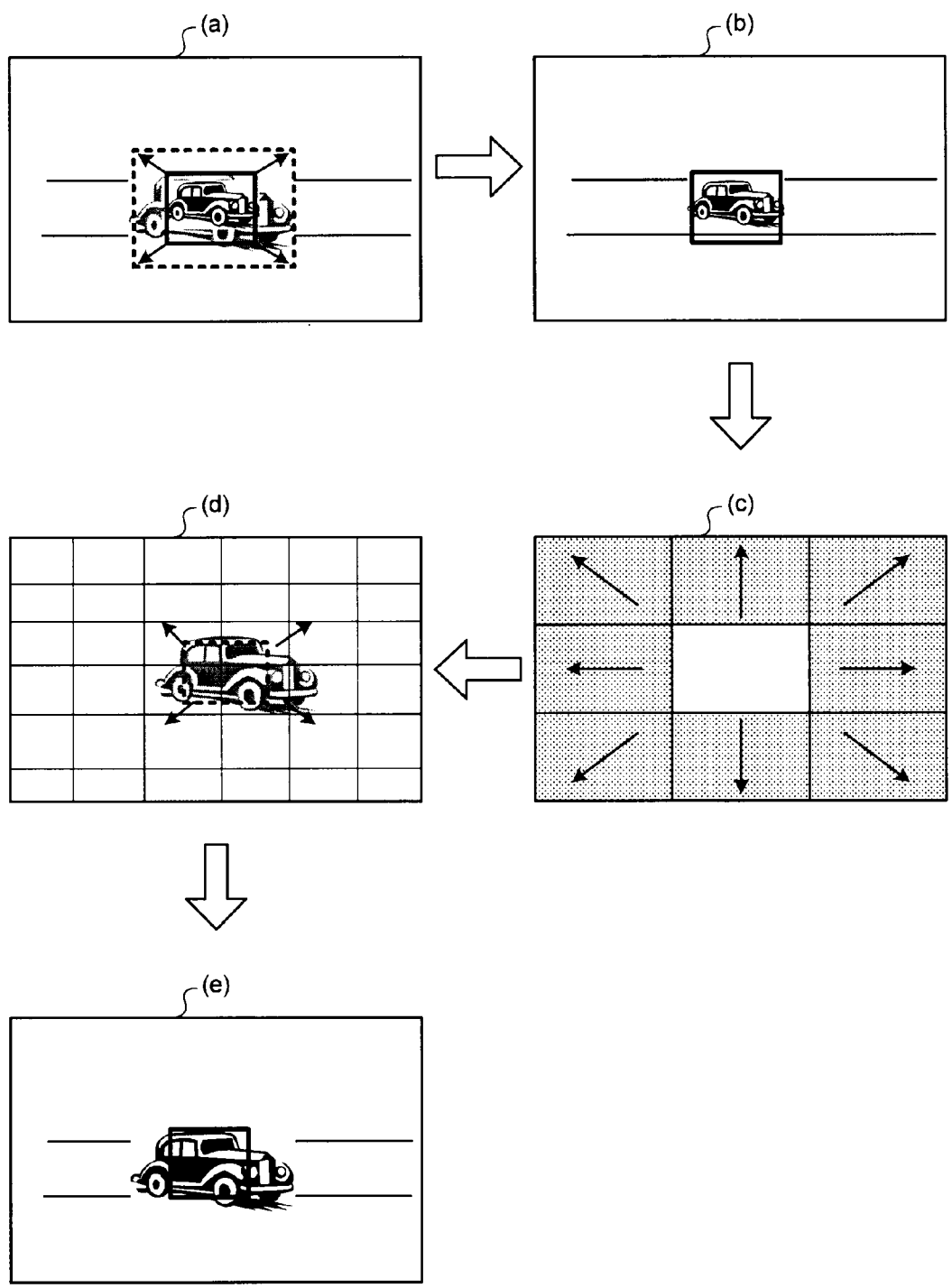
FIG. 29 is a diagram illustrating an image in a series of processes when the photographer moves to the object.

FIG. 27 shows images in a series of processes according to this embodiment. FIG. 27 shows an example in which the photographer moves the digital still camera to change the composition of the object. FIG. 28 shows an example in which the photographer takes a follow shot of a distant object. FIG. 29 shows an example in which the photographer moves to the object. FIGS. 27(a), 28(a), and 29(a) show images in each situation. When the AF area is set as shown in FIGS. 27(b), 28(b), and 29(b) at the time when the release shutter SW1 is pressed, the movement of the image in the divided block including the AF area is detected as shown in FIGS. 27(c), 28(c), and 29(c). Then, the tracking area is moved to track the object using template matching, as shown in FIGS. 27(d), 28(d), and 29(d), and the AF area is moved to the position of the tracked object, as shown in FIGS. 27(e), 28(e), and 29(e). In this way, the AF operation is performed. In this case, the focus position detection range (the movement range of the focus lens 42a) during the AF operation is extended to the far side in the example shown in FIG. 28. In the example shown in FIG. 29, the focus position detection range during the AF operation is extended to the near side. In the example shown in FIG. 27, the focus position detection range during the AF operation is not extended.

As described in detail above with reference to the detailed examples, in the digital still camera according to this embodiment, the CPU block 1043 in the processor 104 detects the movement of an image on the basis of the difference between a plurality of image data items that has been output from the CCD 101 in time series and then input to the processor 104 through the F/E-IC 102 (movement detecting unit 201), and estimates the movement of the object or the photographer on the basis of the detected movement of the image (estimating unit 202). Then, the CPU block 1043 detects the focus position on the basis of the estimated movement of the object or the photographer, that is, the CPU block 1043 sets the movement range of the focus lens 42a (focus position detection range setting unit 203). The CPU block 1043 detects the focus position while moving the focus lens 42a in the set focus position detection range (focus position detecting unit 204). Therefore, even when the object relatively moves in the depth direction of the screen by the movement of the photograph or the object, it is possible to appropriately perform the AF operation without losing the focus position. It is possible to capture an appropriate image in which the object is in focus.

According to the invention, the movement range of the focus lens is set on the basis of the movement of the object or the photographer estimated from the movement of an image, and the focus position is detected while the focus lens is moved in the set movement range. Therefore, it is possible to appropriately perform an AF operation without losing the focus position where the object is in focus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An imaging apparatus, comprising:
a focus lens;
an imaging device that receives light incident through the focus lens and outputs image data;
a movement detecting unit that detects the movement of an image on the basis of a difference between a plurality of image data which is output from the imaging device in time series;
an estimating unit that estimates the movement of an object or a photographer on the basis of the movement of the image detected by the movement detecting unit;
a movement range setting unit that sets a movement range of the focus lens on the basis of the movement of the object or the photographer estimated by the estimating unit; and
a focus position detecting unit that moves the focus lens in an optical axis direction in the movement range set by the movement range setting unit and detects a focus position where the focus lens is focused on the position of the object of the image,
wherein the movement detecting unit divides the image data output from the imaging device into a plurality of areas and detects the movement of the image in each of the divided areas,
the estimating unit estimates the relative movement between the object and the photographer on the basis of the position of the divided area whose movement is detected by the movement detecting unit and the direction of the movement of the divided area,
when the estimating unit estimates that the object and the photographer move relative to each other in a direction in which the distance between the object and the photographer is reduced, the movement range setting unit sets the movement range of the focus lens so as to be extended in a near-side direction, as compared to a case in which the distance between the object and the photographer does not vary,
when the estimating unit estimates that the object and the photographer move relative to each other in a direction in which the distance between the object and the photographer increases, the movement range setting unit sets the movement range of the focus lens so as to be extended in a far-side direction, as compared to the case in which the distance between the object and the photographer does not vary,
wherein the estimating unit estimates that the object is away from the photographer when the movement detecting unit detects movement only in the divided area including the position of the object and the direction of the movement detected in the divided area including the position of the object is opposite to the gravity direction, and
when the estimating unit estimates that the object is away from the photographer, the movement range setting unit sets the movement range of the focus lens so as to be extended in the far-side direction, as compared to a case in which the object does not move.

2. An imaging apparatus, comprising:
a focus lens;
an imaging device that receives light incident through the focus lens and outputs image data;
a movement detecting unit that detects the movement of an image on the basis of a difference between a plurality of image data which is output from the imaging device in time series;
an estimating unit that estimates the movement of an object or a photographer on the basis of the movement of the image detected by the movement detecting unit;
a movement range setting unit that sets a movement range of the focus lens on the basis of the movement of the object or the photographer estimated by the estimating unit; and
a focus position detecting unit that moves the focus lens in an optical axis direction in the movement range set by the movement range setting unit and detects a focus position where the focus lens is focused on the position of the object of the image,
wherein the movement detecting unit divides the image data output from the imaging device into a plurality of areas and detects the movement of the image in each of the divided areas,
the estimating unit estimates the relative movement between the object and the photographer on the basis of the position of the divided area whose movement is detected by the movement detecting unit and the direction of the movement of the divided area,
when the estimating unit estimates that the object and the photographer move relative to each other in a direction in which the distance between the object and the photographer is reduced, the movement range setting unit sets the movement range of the focus lens so as to be extended in a near-side direction, as compared to a case in which the distance between the object and the photographer does not vary,
when the estimating unit estimates that the object and the photographer move relative to each other in a direction in which the distance between the object and the photographer increases, the movement range setting unit sets the movement range of the focus lens so as to be extended in a far-side direction, as compared to the case in which the distance between the object and the photographer does not vary,
wherein the estimating unit estimates that the photographer takes a follow shot of a near object when the movement detecting unit detects movement in the same direction in the divided areas other than the divided area including the position of the object and the direction of the movement detected in the divided areas other than the divided area including the position of the object is the gravity direction, and
when the estimating unit estimates that the photographer takes the follow shot of the near object, the movement range setting unit sets the movement range of the focus lens so as to be extended in the near-side direction, as compared to a case in which the object does not move.

3. An imaging apparatus, comprising:
a focus lens;
an imaging device that receives light incident through the focus lens and outputs image data;

a movement detecting unit that detects the movement of an image on the basis of a difference between a plurality of image data which is output from the imaging device in time series;

an estimating unit that estimates the movement of an object or a photographer on the basis of the movement of the image detected by the movement detecting unit;

a movement range setting unit that sets a movement range of the focus lens on the basis of the movement of the object or the photographer estimated by the estimating unit; and a focus position detecting unit that moves the focus lens in an optical axis direction in the movement range set by the movement range setting unit and detects a focus position where the focus lens is focused on the position of the object of the image, wherein the movement detecting unit divides the image data output from the imaging device into a plurality of areas and detects the movement of the image in each of the divided areas, the estimating unit estimates the relative movement between the object and the photographer on the basis of the position of the divided area whose movement is detected by the movement detecting unit and the direction of the movement of the divided area, when the estimating unit estimates that the object and the photographer move relative to each other in a direction in which the distance between the object and the photographer is reduced, the movement range setting unit sets the movement range of the focus lens so as to be extended in a near-side direction, as compared to a case in which the distance between the object and the photographer does not vary, when the estimating unit estimates that the object and the photographer move relative to each other in a direction in which the distance between the object and the photographer increases, the movement range setting unit sets the movement range of the focus lens so as to be extended in a far-side direction, as compared to the case in which the distance between the object and the photographer does not vary, wherein the estimating unit estimates that the photographer takes a follow shot of a distant object when the movement detecting unit detects movement in the same direction in the divided areas other than the divided area including the position of the object and the direction of the movement detected in the divided areas other than the divided area including the position of the object is opposite to the gravity direction, and when the estimating unit estimates that the photographer takes the follow shot of the distant object, the movement range setting unit sets the movement range of the focus lens so as to be extended in the far-side direction, as compared to a case in which the object does not move.

4. An imaging apparatus, comprising:

a focus lens;

an imaging device that receives light incident through the focus lens and outputs image data;

a movement detecting unit that detects the movement of an image on the basis of a difference between a plurality of image data which is output from the imaging device in time series;

an estimating unit that estimates the movement of an object or a photographer on the basis of the movement of the image detected by the movement detecting unit;

a movement range setting unit that sets a movement range of the focus lens on the basis of the movement of the object or the photographer estimated by the estimating unit; and a focus position detecting unit that moves the focus lens in an optical axis direction in the movement range set by the movement range setting unit and detects a focus position where the focus lens is focused on the position of the object of the image, wherein the movement detecting unit divides the image data output from the imaging device into a plurality of areas and detects the movement of the image in each of the divided areas, the estimating unit estimates the relative movement between the object and the photographer on the basis of the position of the divided area whose movement is detected by the movement detecting unit and the direction of the movement of the divided area, when the estimating unit estimates that the object and the photographer move relative to each other in a direction in which the distance between the object and the photographer is reduced, the movement range setting unit sets the movement range of the focus lens so as to be extended in a near-side direction, as compared to a case in which the distance between the object and the photographer does not vary, when the estimating unit estimates that the object and the photographer move relative to each other in a direction in which the distance between the object and the photographer increases, the movement range setting unit sets the movement range of the focus lens so as to be extended in a far-side direction, as compared to the case in which the distance between the object and the photographer does not vary, wherein the estimating unit estimates that the photographer is moving to the object when the movement detecting unit detects movement in a direction away from the divided area including the position of the object in the divided areas other than the divided area including the position of the object, and when the estimating unit estimates that the photographer is moving to the object, the movement range setting unit sets the movement range of the focus lens so as to be extended in the near-side direction, as compared to a case in which the photographer does not move.

5. An imaging apparatus, comprising:

a focus lens;

an imaging device that receives light incident through the focus lens and outputs image data;

a movement detecting unit that detects the movement of an image on the basis of a difference between a plurality of image data which is output from the imaging device in time series;

an estimating unit that estimates the movement of an object or a photographer on the basis of the movement of the image detected by the movement detecting unit;

a movement range setting unit that sets a movement range of the focus lens on the basis of the movement of the object or the photographer estimated by the estimating unit; and a focus position detecting unit that moves the focus lens in an optical axis direction in the movement range set by the movement range setting unit and detects a focus position where the focus lens is focused on the position of the object of the image, wherein the movement detecting unit divides the image data output from the imaging device into a plurality of areas and detects the movement of the image in each of the divided areas, the estimating unit estimates the relative movement between the object and the photographer on the basis of the position of the divided area whose movement is detected by the movement detecting unit and the direction of the movement of the divided area, when the estimating unit estimates that the object and the photographer move relative to each other in a direction in which the distance between the object and the photographer is reduced, the movement range setting unit sets the movement range of the focus lens so as to be extended in a near-side direction, as compared to a case in which the distance between the object and the photographer does not vary, when the estimating unit estimates that the object and the photographer move relative to each other in a direction in which the distance between the object and the photographer increases, the movement range setting unit sets the movement range of the focus lens so as to be extended in a far-side direction, as compared to the case in which the distance between the object and the photographer does not vary, wherein the estimating unit estimates that the photographer is moving away from the object when the movement detecting unit detects movement in a direction to the divided area including the position of the object in the divided areas other than the divided area including the position of the object, and when the estimating unit estimates that the photographer is moving away from the object, the movement range setting unit sets the movement range of the focus lens so as to be extended in the far-side direction, as compared to a case in which the photographer does not move.

6. An imaging apparatus, comprising:

a focus lens;

an imaging device that receives light incident through the focus lens and outputs image data;

a movement detecting unit that detects the movement of an image on the basis of a difference between a plurality of image data which is output from the imaging device in time series;

an estimating unit that estimates the movement of an object or a photographer on the basis of the movement of the image detected by the movement detecting unit;

a movement range setting unit that sets a movement range of the focus lens on the basis of the movement of the object or the photographer estimated by the estimating unit; and a focus position detecting unit that moves the focus lens in an optical axis direction in the movement range set by the movement range setting unit and detects a focus position where the focus lens is focused on the position of the object of the image, wherein the movement detecting unit divides the image data output from the imaging device into a plurality of areas and detects the movement of the image in each of the divided areas, the estimating unit estimates the relative movement between the object and the photographer on the basis of the position of the divided area whose movement is detected by the movement detecting unit and the direction of the movement of the divided area, when the estimating unit estimates that the object and the photographer move relative to each other in a direction in which the distance between the object and the photographer is reduced, the movement range setting unit sets the movement range of the focus lens so as to be extended in a near-side direction, as compared to a case in which the distance between the object and the photographer does not vary, when the estimating unit estimates that the object and the photographer move relative to each other in a direction in which the distance between the object and the photographer increases, the movement range setting unit sets the movement range of the focus lens so as to be extended in a far-side direction, as compared to the case in which the distance between the object and the photographer does not vary, wherein the estimating unit estimates that the distance between the object and the photographer is not changed when the movement detecting unit detects movement in the same direction in all of the divided areas.

* * * * *